US010616278B1

(12) United States Patent
Johansson et al.

(10) Patent No.: US 10,616,278 B1
(45) Date of Patent: Apr. 7, 2020

(54) SECURE VIRTUAL MEETINGS

(71) Applicant: Amazon Technologies, Inc., Seattle, WA (US)

(72) Inventors: Jesper Mikael Johansson, Redmond, WA (US); Robert Dale Francis, Seattle, WA (US); David Ruysser Gabler, Atascadero, CA (US); Thaddeus C. Pritchett, Edmonds, WA (US); Siddhartha Shankara Rao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/673,846

(22) Filed: Mar. 30, 2015

(51) Int. Cl.
*H04L 29/06* (2006.01)
*G06F 17/22* (2006.01)

(52) U.S. Cl.
CPC .......... *H04L 63/20* (2013.01); *G06F 17/2235* (2013.01); *H04L 63/0838* (2013.01); *H04L 63/10* (2013.01); *H04L 65/403* (2013.01)

(58) Field of Classification Search
CPC ..... H04L 63/20; H04L 63/0838; H04L 63/10; H04L 65/403; G06F 17/2235
USPC .......................................................... 726/1
See application file for complete search history.

(56) References Cited

U.S. PATENT DOCUMENTS

| | | | | |
|---|---|---|---|---|
| 5,907,324 A * | 5/1999 | Larson | ................ | H04L 12/1822 715/751 |
| 8,346,864 B1 * | 1/2013 | Amidon | .............. | H04L 65/1069 709/204 |
| 8,576,750 B1 * | 11/2013 | Hecht | ...................... | H04M 3/56 370/261 |
| 8,578,465 B2 * | 11/2013 | Xiao | ................... | H04L 63/0236 709/204 |
| 8,850,385 B2 * | 9/2014 | Ahlgren | ................. | G06F 9/468 717/104 |
| 2005/0058125 A1 * | 3/2005 | Mutikainen | ....... | H04L 29/12292 370/354 |
| 2005/0084086 A1 * | 4/2005 | Hesse | ................. | H04L 12/1818 379/202.01 |
| 2005/0262249 A1 * | 11/2005 | Koskelainen | ....... | H04L 12/1827 709/229 |
| 2006/0130140 A1 * | 6/2006 | Andreev | ............. | H04L 63/1458 726/23 |
| 2008/0069011 A1 * | 3/2008 | Sekaran | ............. | H04L 12/1813 370/260 |
| 2008/0076391 A1 * | 3/2008 | Chen | ...................... | H04M 3/56 455/411 |

(Continued)

*Primary Examiner* — Peter C Shaw

(74) *Attorney, Agent, or Firm* — Davis Wright Tremaine LLP

(57) ABSTRACT

A virtual meeting service receives a request from a participant through a computing device to join a virtual meeting. The request includes an identifier, which the virtual meeting service uses to identify one or more policies of the virtual meeting. The virtual meeting service, upon identifying these one or more policies, evaluates the one or more policies to determine whether to enable the computing device to be used to allow the participant to join the virtual meeting. If the virtual meeting service determines that the participant can join the virtual meeting, the virtual meeting service transmits a request to a telecommunications channel to connect the computing device to the virtual meeting, allowing the participant to join the virtual meeting.

23 Claims, 11 Drawing Sheets

(56) References Cited

U.S. PATENT DOCUMENTS

| | | | |
|---|---|---|---|
| 2009/0179983 A1* | 7/2009 | Schindler | H04L 12/1818 348/14.08 |
| 2011/0271332 A1* | 11/2011 | Jones | H04L 9/3247 726/7 |
| 2012/0140681 A1* | 6/2012 | Kaminsky | H04L 65/403 370/261 |
| 2014/0139609 A1* | 5/2014 | Lu | H04N 7/15 348/14.03 |
| 2014/0289827 A1* | 9/2014 | Tang | H04L 63/08 726/6 |
| 2015/0020217 A1* | 1/2015 | Gulbrandsen | G06F 21/6218 726/28 |
| 2015/0172333 A1* | 6/2015 | Lindstrom | H04L 65/1016 370/261 |
| 2016/0026776 A1* | 1/2016 | Hurst | G06F 21/602 713/165 |

* cited by examiner

Virtual Meeting Room Setup

Meeting Start Time: 12:00 PM — 202

Meeting End Time: 1:00 PM — 204

Meeting Date: March 21, 2015 — 206

Meeting Location: Conference Room B – VCU & Phone — 208

Participants:
Juan Del Pueblo (juandpueblo@example.com)   Preferences
John Q. Public (johnqpublic@example.com)    Preferences
Fulano De Tal (fulano@example.com)          Preferences
Mattı Meikäläinen (mattim@example.com)      Preferences
— 210

SUBMIT — 212

Virtual Meeting Room Setup

Matti Meikäläinen - Preferences

- ○ Call Office Phone At Start Time
- ○ Call Home Phone At Start Time
- ● Call Mobile Phone At Start Time
- ○ Allow Matti To Initiate And Call Back
- ○ Contact Other: [_____]

[ SUBMIT ]

FIG. 3

SECURE VIRTUAL MEETINGS

BACKGROUND

Virtual meeting services and other teleconferencing services often enable customers and other users to interact with one another over a telecommunications system. A customer of a virtual meeting service may be provided with a conference identifier and a personal identification number (PIN), which, collectively, may be utilized to schedule a virtual meeting for the customer and other users that the customer wishes to engage with. Once the virtual meeting has been scheduled, the customer may provide the conference identifier to these other users to enable these other users to join the virtual meeting over the telecommunications system at the specified date and time. However, the conference identifier and PIN may be obtained by third parties, presenting certain issues. For instance, a third party that has obtained the conference identifier and PIN may utilize this information to create their own virtual meetings, increasing the potential risk for fraud. Additionally, the conference identifier may be used by a third party to access a virtual meeting, even if the third party is not authorized to do so. This may result in potential data and information leakage and potential harm to the customer and any other users attending the virtual meeting.

BRIEF DESCRIPTION OF THE DRAWINGS

Various embodiments in accordance with the present disclosure will be described with reference to the drawings, in which:

FIG. 2 shows an illustrative example of a graphical user interface in which a moderator of a virtual meeting provides one or more parameters for a virtual meeting and specifies one or more participants for the virtual meeting in accordance with at least one embodiment;

FIG. 3 shows an illustrative example of a graphical user interface in which a moderator or participant specifies the preferred method for contacting the participant upon the start of a virtual meeting in accordance with at least one embodiment;

DETAILED DESCRIPTION

Figure 1:
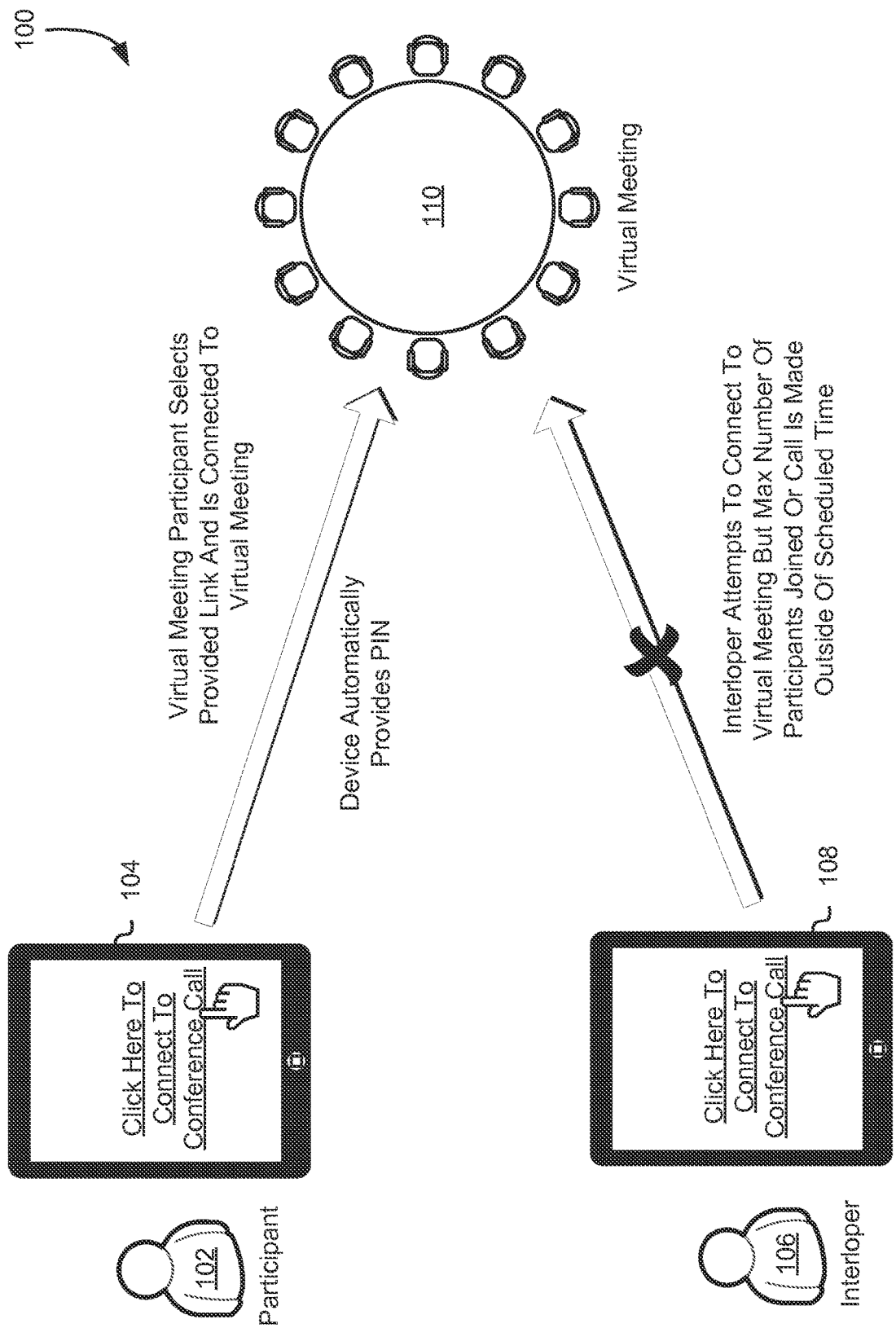
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the configuration and operation of secure virtual meetings. In an embodiment, a customer of a virtual meeting service transmits a request to the virtual meeting service to schedule a virtual meeting, such as a conference call among various participants. The request may specify the date, start time and end time of the virtual meeting, as well as a physical location where participants may attend the virtual meeting in person or utilize audiovisual conferencing equipment to access the virtual meeting. The request may further specify the desired participants for the virtual meeting and policies applicable to a virtual meeting invitation to be sent to each of the desired participants. For certain participants, the customer may specify a preferred method in which the participant is to be contacted by the virtual meeting service when the virtual meeting has begun. For instance, the customer may specify a phone number for a mobile device of a participant, which the virtual meeting service is to contact in order to enable the participant to join the virtual meeting. Alternatively, for other participants that are also customers of the virtual meeting service, the virtual meeting service may enable these participants to utilize an application to provide a preferred contact method.

When the virtual meeting service receives the request to schedule a virtual meeting, the virtual meeting service may utilize the provided virtual meeting and participant information to generate a virtual meeting invitation message for each desired participant. Each virtual meeting invitation message may include a unique link, which may include a uniform resource locator (URL) to the virtual meeting service or may execute an application installed on the participant's computing device configured to provide information to the virtual meeting service on behalf of the participant. The link may include an identifier, which may be unique to the participant and may be used by the virtual meeting service to identify the participant, virtual meeting, and phone number of a telecommunications channel usable to access the virtual meeting. When the participant invokes the link included in the virtual meeting invitation message, the application may parse the link to obtain the identifier and may make a HyperText Transfer Protocol (HTTP) call to the virtual meeting service to request that the virtual meeting service contact the participant to join the virtual meeting. Alternatively, if the participant is not utilizing an application to submit the request to join the virtual meeting, the virtual meeting service may utilize the provided identifier from the link to identify the preferred contact method provided by the customer that generated the virtual meeting invitation. Note that while a single identifier used throughout for the purpose of illustration, additional identifiers may be used in various embodiments. For example, a combination of different identifiers may uniquely identify a virtual meeting.

In an embodiment, once the virtual meeting service has received a request from a participant to join the virtual meeting, the virtual meeting service will determine whether the participant is authorized to join the virtual meeting. For instance, based on the provided identifier, the virtual meeting service may identify the particular virtual meeting associated with the virtual meeting invitation message, the desired participant, any policies applicable to the invitation message, and the like. If the request to join the virtual meeting is received prior to scheduled start time of the virtual meeting or if the virtual meeting has a maximum number of participants attending the virtual meeting, the virtual meeting service may deny the request to join the virtual meeting. Alternatively, if the request is received at the correct time but the customer has not initiated the telecommunications channel for the virtual meeting, the virtual meeting service may notify the customer through a preferred method to inform the customer that he/she is required to open the telecommunications channel to enable participants to join the virtual meeting. If the participant, based on the provided identifier, is authorized to join the virtual meeting, the virtual meeting service may determine the preferred contact method for the participant and utilize this contact method to contact the participant and enable the participant to join the virtual meeting. For instance, if the virtual meeting service is to contact the participant through his/her mobile device, the virtual meeting service may initiate a call to the participant's mobile device.

In this manner, virtual meetings may be scheduled by legitimate customers of a virtual meeting service with a greatly reduced risk of unauthorized participant access to these virtual meetings. In addition, the techniques described herein facilitate additional technical advantages. For example, because, in some embodiments, participants that are also customers of the virtual meeting service may provide a preferred contact method to the virtual meeting service, the virtual meeting service may enable these participants to be contacted automatically upon the participant's selection of the link included within the virtual meeting invitation message. This may greatly increase the likelihood that the participant will be available to attend the virtual meeting from a preferred location or through a preferred device.

FIG. 1 shows an illustrative example of an environment in which various embodiments can be implemented. In the environment 100, a participant 102 may receive one or more virtual meeting invitation messages from a virtual meeting service through a messaging client (e.g., e-mail application, etc.) installed on his/her computing device 104. The one or more virtual meeting invitation messages may include a link, which the participant 102 may utilize to join the virtual meeting 110 at a specific time as specified within the virtual meeting invitation messages or as indicated by a moderator of the virtual meeting 110. The virtual meeting 110 may be a conference call among various participants 102, which may enable these participants 102 to communicate with one another. In some embodiments, the link may be a URL which, when selected, may cause the computing device 104 to transmit an HTTP call to the virtual meeting service to join the participant 102 to the virtual meeting 110. For instance, the URL may include an identifier (e.g., Globally Unique Identifier (GUID), a cryptographically secure identifier, etc.), which may be unique to the participant 102 and may be used by the virtual meeting service to identify the participant 102 of the virtual meeting 110, a preferred method for contacting the participant 102, the virtual meeting 110 the participant 102 is authorized to join, and one or more parameters for the virtual meeting 110 (e.g., date, start time, end time, maximum number of participants, etc.). In some embodiments, the computing device 104 may transmit, in addition to the HTTP call to the virtual meeting service, distinct identifiers usable to identify the participant 102 to identify the virtual meeting 110 the participant 102 is trying to join. Further, the computing device 104 may transmit a set of credential associated with the participant 102, which the virtual meeting service may use to authenticate the participant 102 and determine whether the participant 102 is authorized to join the virtual meeting 110.

In an embodiment, the link provided to the participant 102 through the computing device 104, when selected, causes the computing device 104 to launch an application installed on the computing device 104 configured to interact with the virtual meeting service. This application installed on the computing device 104 may only be obtained by particular participants 102. For instance, the participant 102 may need to be an employee or other associate of the virtual meeting moderator that configured the virtual meeting 110. Thus, the application may be internal to an organization that has contracted for the use of the virtual meeting service or that maintains the virtual meeting service itself for use by its employees and other associates. In some embodiments, the participant 102 is required to provide a authentication claim information or other authentication claim information associated with the participant 102 to utilize the application. This may enable the virtual meeting service to authenticate the participant 102 and determine whether the participant 102 may join the virtual meeting 110. The link used to launch this application may also include the particular identifier for the participant 102. Thus, when the participant 102 selects the link through his/her computing device 104, the computing device 104 may launch the associated application, which may parse the link to obtain the identifier and initiate communications with the virtual meeting service to determine whether the participant 102 may join the virtual meeting 110. Additionally, if the virtual meeting 110 has not commenced, the participant 110 may utilize the application to define his/her contact preferences. For instance, the participant 102 may specify, through the application, that the participant 102 should be contacted through his/her mobile device when the telecommunications channel for the virtual meeting 102 has been opened. The telecommunications channel may include one or more telecommunications equipment necessary to connect various telephone connections to a virtual meeting. Alternatively, the participant 102 may specify that he/she will invoke the provided link at the start of the virtual meeting 110, which, in turn, may cause the virtual meeting service to contact the participant 102 upon detection of this invocation.

The link provided to each participant 102 of the virtual meeting 110 may be generated by the virtual meeting service based at least in part on a virtual meeting moderator's preferences when configuring the virtual meeting 110 through the virtual meeting service. For instance, a moderator may access the virtual meeting service to request creation of a virtual meeting 110 to enable interaction among a variety of participants 102 of the moderator's choosing and the moderator himself/herself. The moderator, through the virtual meeting service, may specify the date, start time and end time for the virtual meeting 110. Further, the moderator may identify one or more participants 102 that may attend this virtual meeting 110 and, for each participant 102, a preferred contact method, which the virtual meeting service may use to contact the participant 102 once the virtual meeting 110 has started or upon invocation of the link provided to the participant 102 within the virtual meeting invitation message. The moderator, through the virtual meeting service, may specify for each participant 102 that is authorized to join the virtual meeting 110 an identifier associated with each participant 102. Thus, when the participant 102 selects the URL to join the virtual meeting, his/her computing device 104 may further provide this identifier, which the virtual meeting service may utilize to determine whether the participant 102 is authorized to join the virtual meeting 110.

In some embodiments, the moderator may further specify a number of policies that are to be applicable for each participant 102 or to the virtual meeting itself 110. For example, a moderator may specify, through a policy, that only a certain number of participants 102 may join the virtual meeting 110. Thus, if any other participants 102 attempt to join the virtual meeting 110 once this maximum number has been reached, these other participants 102 may not be permitted to join the virtual meeting 110. Additionally, or alternatively, a moderator may generate a policy to specify that for a particular virtual meeting invitation message, only a maximum number of participants 102 may utilize this particular virtual meeting invitation message to access the virtual meeting 102. For example, if the virtual meeting invitation message is not linked to a particular contact method, when a participant 102 invokes the link provided within the message to access the virtual meeting 110, the virtual message service may obtain the identifier from the link and determine how many times the identifier has been utilized to access the virtual meeting 110. If the maximum number of uses has been reached, the virtual meeting service may deny the request to access the virtual meeting 110. In an embodiment, the virtual meeting service can evaluate other information obtained from the participant's 102 computing device 104 to determine whether the participant 102 should be permitted to access the virtual meeting 110. For example, the virtual meeting service may determine the location of the computing device 104 and, if the location is known to be unsecure (e.g., locations from which previous attacks on telecommunications systems have originated from, locations having high incidents of telecommunications fraud, etc.), the virtual meeting service may deny the request to join the virtual meeting 110 and/or increase the security requirements for joining the virtual meeting 110.

If an interloper 106 or other unauthorized person utilizes his/her computing device 108 to access the virtual meeting 110 using a virtual meeting invitation message obtained through nefarious means, the virtual meeting service may prevent such unauthorized access to the virtual meeting 110. For instance, if the link, when invoked, would cause an application installed on a computing device to be launched to enable a participant 102 to join the virtual meeting 110, an interloper's 106 computing device 108 may not have the application necessary to access the virtual meeting service and enable the interloper 106 to join the virtual meeting 110. Thus, when an interloper 106 selects this unique link to the application, the computing device 108 may not be able to process the invocation of the link, thus preventing the interloper 106 from joining the virtual meeting 110.

Alternatively, if the link included within the virtual meeting invitation message is a URL to the virtual meeting service that includes a unique identifier, the virtual meeting service may evaluate the provided identifier to determine whether the interloper 106 may access the virtual meeting 110. For instance, if the interloper 106 has invoked the link at a time outside of the schedule virtual meeting 110 time, the virtual meeting service may determine that the virtual meeting 110 has either not begun or has concluded and deny the interloper's 106 request to join the virtual meeting 110 or further interact with the virtual meeting service. Alternatively, if the virtual meeting 110 has been started, the virtual meeting service may determine that a maximum number of participants 102 have joined the virtual meeting 110, thereby leaving no capacity for the interloper 106 to access the virtual meeting 110.

In some embodiments, if the interloper 106 invokes the link and the virtual meeting service determines that the participant 102 associated with the link may join the virtual meeting 110, the virtual meeting service may obtain the preferred contact method for the participant 102 and utilize this method to contact the participant 102. This may prevent the interloper 106 from being contacted by the virtual meeting service to join the virtual meeting 110, effectively notifying the participant 102 of the potential data breach and enabling the participant 102 to address the security concern. This may prevent further virtual meeting invitation messages from being transmitted to the interloper 106 through his/her computing device 108. Alternatively, if the virtual meeting service determines that the interloper 106 has invoked the link from a potentially dangerous location (e.g., rogue nation, location known for social engineering and hacking, etc.), the virtual meeting service may outright deny the request from the interloper 106 to access the virtual meeting 110 through use of his/her computing device 108. Thus, any unauthorized entities attempting to access a virtual meeting 110 may find it to be more difficult to join the virtual meeting 110.

In some instances, when the interloper 106 invokes the link, the virtual meeting service may prompt the interloper 106 for authentication claim information (e.g., sets of credentials, identifiers, etc.) usable for authentication and authorization. If the interloper 106 is unable to provide a valid authentication claim information to the virtual meeting service to join the virtual meeting 110, the virtual meeting service may deny the interloper's 106 request to access the virtual meeting 110. If the interloper 106 does provide valid authentication claim information to the virtual meeting service, the virtual meeting service may utilize this authentication claim information to determine whether the interloper 106 is actually authorized to join the virtual meeting 110. For instance, the authentication claim information may include an identifier associated with the interloper 106. If this identifier is not specified within the moderator's provided identifiers for participants of the virtual meeting 110, the virtual meeting service may determine that the interloper 106 is not authorized to join the virtual meeting 110 and deny the interloper's 106 request.

In an embodiment, when the participant 102 invokes the link to join the virtual meeting 110, the participant 102 will be instructed to transmit a Short Message Service (SMS) message or other electronic message to the virtual meeting service that includes a one-time password (OTP) generated using an OTP token provided to the participant 102 by the virtual meeting service or other authorized entity. The virtual meeting service may associate this provided OTP token with a participant identifier, which may also be provided within the SMS message to the virtual meeting service. The OTP token may be synchronized with a common seed value such that the virtual meeting service may determine the expected one-time password for the participant 102. If the passwords match, the virtual meeting service may authenticate the participant 102 and identify any applicable policies to determine whether the participant 102 is authorized to join the virtual meeting 110. If the participant 102 is authorized to join the virtual meeting 110, the virtual meeting service may identify any participant 102 preferences and utilize these preferences to enable the participant 102 to join the virtual meeting 110.

As noted above, a moderator of a virtual meeting may access a virtual meeting service to configure and schedule a virtual meeting, such as a conference call, for a number of desired participants and the moderator himself/herself. Accordingly, FIG. 2 shows an illustrative example of a graphical user interface (GUI) 200 in which a moderator of a virtual meeting provides one or more parameters for a virtual meeting and specifies one or more participants for the virtual meeting in accordance with at least one embodiment. The GUI 200 may be provided by the virtual meeting service and accessible through a user client (e.g., browser application) installed on the moderator's computing device. Alternatively the GUI 200 may be accessible by the moderator through a virtual meeting service application installed on the moderator's computing device and configured to communicate with the virtual meeting service as necessary.

Through the GUI 200, the moderator may specify when the virtual meeting is to be scheduled to occur, as well as any physical locations that may be reserved for participants that wish to attend the virtual meeting in person. For instance, the GUI 200 may include a meeting start time drop down menu 202, a meeting end time drop down menu 204, and a meeting date drop down menu 206, which the moderator of the virtual meeting may utilize to specify the time parameters for the virtual meeting. For example, based at least in part on the date selected through the meeting date drop down menu 206, the GUI 200 may be configured to provide, through the meeting start time drop down menu 202, a selection of available start times for the virtual meeting and, through the meeting end time drop down menu 204, a selection of available end times for the virtual meeting. In order to determine which start times are available, the virtual meeting service may access a meeting schedule data store to identify any virtual meetings that have been previously scheduled. The previously scheduled virtual meeting times may be obscured or removed from the meeting start time drop down menu 202 and the meeting end time drop down menu 204 in order to prevent any conflicting virtual meetings. Additionally, the virtual meeting service may access the moderator's own personal schedule within the moderator's participant profile to identify any potential scheduling conflicts and eliminate these conflicting times from the meeting start time drop down menu 202 and the meeting end time drop down menu 204 for the selected meeting date.

Once the moderator of the virtual meeting has established, through the meeting start time drop down menu 202, the meeting end time drop down menu 204, and the meeting date drop down menu 206, the virtual meeting time, the moderator may utilize a virtual meeting location input field 208 to specify a physical location where participants wishing to attend the virtual meeting in person may do so. For instance, the virtual meeting service may determine, based at least in part on the provided virtual meeting date and time, any available physical locations that may be used for the virtual meeting. The moderator may select any of these available physical locations through the virtual meeting location input field 208. Alternatively, through the virtual meeting location input field 208, the moderator may specify his/her own physical location where the virtual meeting may be held. This may require the moderator to coordinate with other entities to ensure that the physical location is reserved for his/her virtual meeting.

In some embodiments, the physical location may include one or more audiovisual teleconferencing devices, which may be utilized to access the virtual meeting and interact with others participating in the virtual meeting. For instance, the virtual meeting service may indicate, for each physical location specified within the virtual meeting location input field 208, what audiovisual teleconferencing devices are available within the physical location that may be used for the virtual meeting. When the virtual meeting has been scheduled, the virtual meeting service may reserve the physical location specified (unless the physical location is defined by the moderator) and any audiovisual equipment within the physical location that is to be utilized for the virtual meeting.

The GUI 200 may further include a participant input screen 210, which the moderator may utilize to specify who he/she wants to participate in the virtual meeting to be scheduled. For instance, through the participant input screen 210, the moderator may select the name of a participant, an associated e-mail address for the participant and other contact information that may be used to notify the participant that he/she has been invited to participate in the virtual meeting. Additionally, for each participant specified within the participant input screen 210, the moderator may select a link (e.g., Preferences, as illustrated in FIG. 2) to access a second GUI for the selected participant. As will be described in greater detail below in connection with FIG. 3, the moderator may interact with this second GUI to specify how the participant is to join the virtual meeting once the telecommunications channel for the virtual meeting has been opened. For instance, the moderator may specify that the virtual meeting service is to contact the participant at his home phone number, mobile device phone number, office phone number or any other phone number associated with the participant. Alternatively, the moderator may specify that the participant may initiate contact with the virtual meeting service, which may cause the virtual meeting service to contact the participant through a preferred method to connect the participant to the virtual meeting.

Once the moderator of the virtual meeting has selected the date and time for the virtual meeting, the physical location (if any) for the virtual meeting, and the participants that are to be invited to the virtual meeting, the moderator may select the submit button 212 to approve the provided configuration for the virtual meeting and enable the virtual meeting service to arrange the virtual meeting. For instance, the virtual meeting service may generate, for each participant specified by the moderator, a virtual meeting invitation message, which may include the date, time and location of the virtual meeting. Further, the virtual meeting invitation message may further include a link, which the participant may utilize to join the virtual meeting at the start time of the virtual meeting or at any time during the virtual meeting. The virtual meeting service may generate, for each participant, a unique identifier that may be included within the link. The unique identifier may be utilized to identify the participant, his/her contact preferences, the virtual meeting which the participant has been invited to attend, any policies associated with the particular participant and/or identifier itself, and the like.

It should be noted that the GUI 200 may include additional or alternative input fields and options for configuring a virtual meeting. For instance, in an embodiment, the virtual meeting service, through the GUI 200, enables moderators of virtual meetings to define one or more policies that may be applicable for a participant of a virtual meeting or for the virtual meeting itself. For instance, the moderator, through the GUI 200, may specify that only the participants specified within the participant input screen 210 are permitted to participate in the virtual meeting. Alternatively, the moderator may specify a maximum number of participants for the virtual meeting. This may enable any specified participant to forward their virtual meeting invitations messages to other persons that should attend the virtual meeting. Under such circumstances, the moderator may need to specify that the particular virtual meeting invitation message to be sent to the participant may be provided to others and that each participant may utilize the link included within the message to join the virtual meeting.

As noted above, a moderator of a virtual meeting, such as a conference call, may access a GUI to specify a preferred contact method for each participant that is to be invited to attend the virtual meeting. Accordingly, FIG. 3 shows an illustrative example of a GUI 300 in which a moderator or participant specifies the preferred method for contacting the participant upon the start of a virtual meeting in accordance with at least one embodiment. The GUI 300 may include a participant preference screen 302, which may enable the moderator of the virtual meeting or the participant himself/herself to define the participant's contact preferences. For instance, when the moderator or participant invokes the GUI 300, the virtual meeting service may obtain, from a participant profile data store, known contact information for the participant that may be utilized to contact the participant when the virtual meeting, such as the conference call, has commenced or in response to an invocation of the link included within the virtual meeting invitation message. This information may have been previously provided by the moderator, obtained from a moderator's contact information database (e.g., virtual address book, etc.), or provided by the participant through the virtual meeting service.

The participant preference screen 302 may include one or more options for a participant contact preference. For each option, the participant preference screen 302 may include a radio button 304, which may be utilized to select the option if so desired. For example, as illustrated in FIG. 3, a moderator or participant has selected a radio button 304 for an option to call the participant's mobile device at the start of the virtual meeting to enable the participant to join the virtual meeting. The participant preference screen 302 may further include a customer contact preference input field 306, which the moderator or participant may utilize to provide an alternative contact method than those specified within the participant preference screen 302. In order for a participant to provide an alternative contact method, he/she may be required to access the GUI 300 through a virtual meeting service application installed on his/her computing device. This application may only be obtained by the participant if the participant is an employee of the virtual meeting service, a service provider that provides the virtual meeting service to its customers, or has an employment association with the moderator of the virtual meeting. Thus, if this application is not utilized to access the GUI 300, the customer contact preference input field 306 may be obscured or not present within the participant preference screen 302.

The GUI 300 may further include a submit button 308, which the moderator or participant of the virtual meeting may use to signify acceptance of the selected contact method for the participant. When the virtual meeting service detects selection of the submit button 308, the virtual meeting service may return the moderator of the virtual meeting to the virtual meeting configuration GUI described above in connection with FIG. 2. Alternatively, if the participant was utilizing the GUI 300 to identify his/her contact preferences, the virtual meeting service may terminate the participant's access to the GUI 300 upon detection of the participant's selection of the submit button 308. Additionally, the virtual meeting service may access the participant's profile within the participant profile data store to specify the preferred contact method upon initiation of the virtual meeting.

In some embodiments, the GUI 300 may include other interface devices other than the radio buttons 304 illustrated in FIG. 3. For instance, instead of the radio buttons 304, each contact method may include a drop down menu which may be utilized to rank each of the contact methods in order of preference. For example, a moderator or participant may specify that the preferred method for contacting the participant is through the participant's mobile device. However, should the virtual meeting service be unable to contact the participant through the mobile device, the virtual meeting service may identify the next preferred contact method and utilize this method to attempt to contact the participant.

The GUI 300 may further include, in some embodiments, options for defining one or more policies applicable to the particular participant. These options may only be available to the moderator when configuring the virtual meeting and may apply to the selected participant and any virtual meeting invitation messages transmitted by the virtual meeting service to the participant. For instance, through the GUI 300, the moderator may specify that the link provided to the participant in the virtual meeting invitation message sent to the participant may only be utilized a certain number of times before the link is no longer valid for use in joining the virtual meeting. Thus, if the participant forwards the virtual meeting invitation message to a number of other users that exceeds the limit specified by the moderator through the policy, only a number of users equal to the limit may utilize the link to access the virtual meeting. Any other users that attempt to join the virtual meeting using the particular link may be denied their request to join the virtual meeting.

Figure 4:
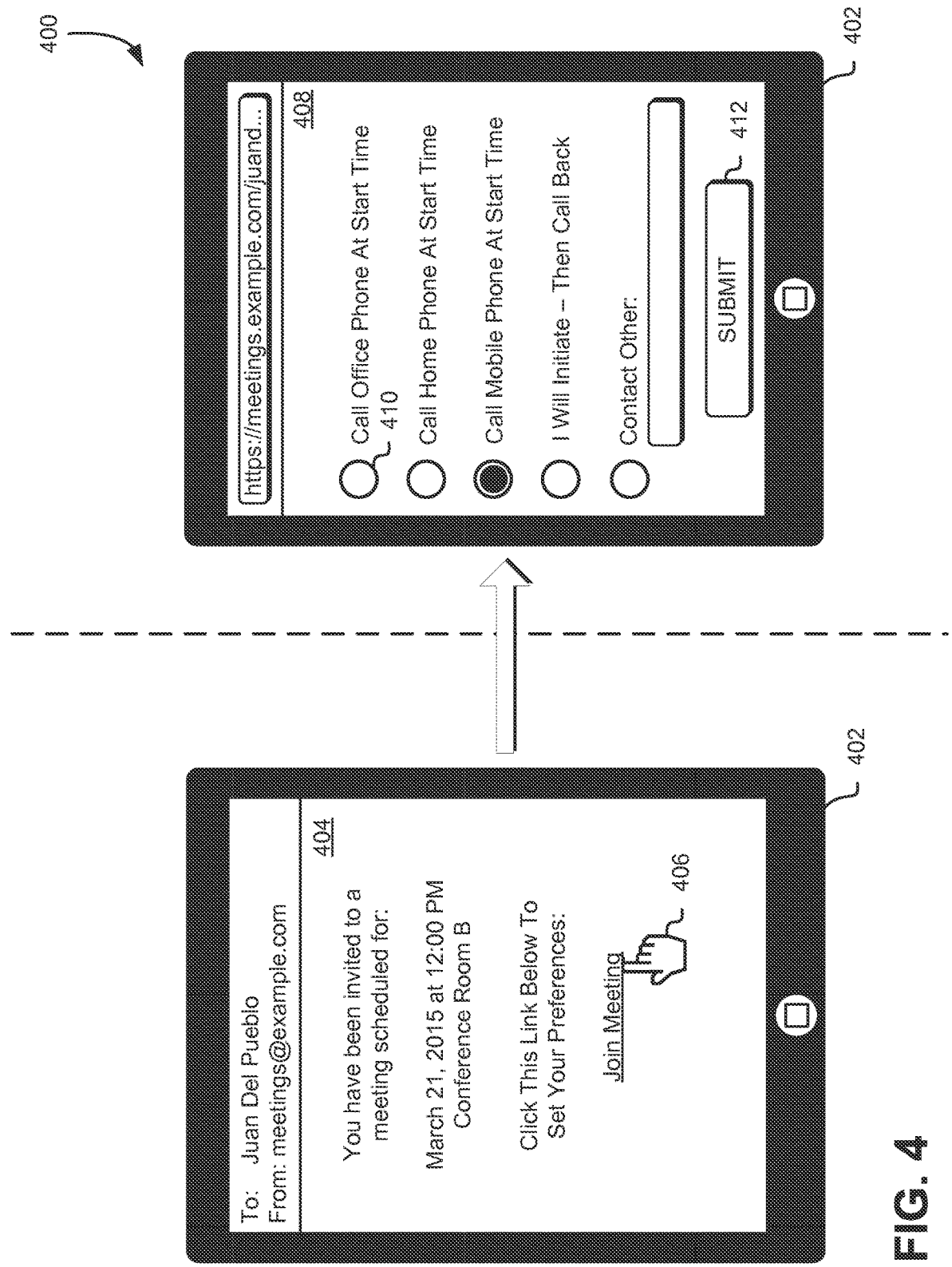
FIG. 4 shows an illustrative example of an environment in which a participant utilizes a link provided through a virtual meeting invitation to specify his/her contact preferences for contacting the participant upon the start of a virtual meeting in accordance with at least one embodiment.

As noted above, when a moderator configured a virtual meeting, such as a conference call, through the virtual meeting service, the virtual meeting service may provide, to each indicated participant, a virtual meeting invitation message. This virtual meeting invitation message may include a link that, when invoked, may cause a computing device of the participant to launch an application usable to access the virtual meeting service and enable the participant to specify a preferred contact method for the participant. The virtual machine service may utilize this preferred contact method to contact the participant when the virtual meeting has commenced. Accordingly, FIG. 4 shows an illustrative example of an environment 400 in which a participant utilizes a link provided through a virtual meeting invitation to specify his/her contact preferences for contacting the participant upon the start of a virtual meeting, such as a conference call, in accordance with at least one embodiment.

In the environment 400, a participant of a virtual meeting may receive a virtual meeting invitation message 404 through a messaging client application installed on his/her computing device 402. This virtual meeting invitation message 404 may specify the date, time and physical location of the virtual meeting, as well as other important information and/or attachments (e.g., computer files, documents, etc.) that the participant may need to prepare for the virtual meeting. Additionally, the virtual meeting invitation message may include a link that the participant may utilize to access a participant preference GUI 408 and define his/her contact preferences. For instance, the participant may utilize a cursor 406 of the computing device 402 to select the link. The link provided within the virtual meeting invitation message 404 may, in some embodiments, be a link to an application installed on the participant's computing device 402 that, when invoked, may cause the computing device 402 to launch the application. Thus, if a third party receives this message 404, and the third party does not have the application installed on his/her computing device, the third party may be unable to access the GUI 408 through use of the link.

When the computing device 402 launches the application as a result of the participant's invocation of the link, the application may parse the link to identify a particular identifier provided with the link. This identifier may be used to identify the participant's profile maintained by the virtual meeting service within a participant profile data store, the scheduled virtual meeting, any policies associated with the participant and the virtual meeting, and any other information regarding the configuration of the virtual meeting. Once the application has obtained the identifier from the link, the application may transmit an HTTP call to the virtual meeting service to access the participant preference GUI 408 for the particular participant. The HTTP call may include the identifier included within the link, which the virtual meeting service may utilize to identify the appropriate participant profile and obtain contact information for the participant that may be used to define the participant contact preferences.

The participant profile GUI 408 may be similar to the GUI described above in connection with FIG. 3. For instance, the participant profile GUI 408 may include, for each participant contact method, a radio button 410, which a participant may utilize to select a particular contact method that should be utilized by the virtual meeting service to contact the participant at the virtual meeting start time. The GUI 408 may further include a submit button 412, which the participant may utilize to affirm any selections made through the GUI 408. The virtual meeting service, upon detecting the participant's selection of the submit button 412, may update the participant's profile within the participant profile data store to specify this preferred contact method. Thus, at the meeting start time, the virtual meeting service may access the participant's profile to identify the preferred contact method and utilize this method to contact the participant and enable the participant to join the virtual meeting.

In some embodiments, the link to the application installed on the computing device 402 may further be utilized by the participant at the start of the virtual meeting to join the virtual meeting. For instance, if the participant or moderator has previously specified that the participant is to be contacted by the virtual meeting service only after the participant has invoked the link, the virtual meeting service may await an HTTP call from the application indicating such an invocation of the link. For example, when the participant invokes the link at the start of the virtual meeting or within a certain amount of time prior (e.g., a moderator may specify that a request to join a virtual meeting may be made a few minutes to the actual start time), the application may obtain the identifier from the link and make an HTTP call to the virtual meeting service to join the virtual meeting. The virtual meeting service may determine, based at least in part on the HTTP call whether the participant may join the virtual meeting and, if so, identify the preferred contact method for the participant. The virtual meeting service may utilize this preferred contact method to contact the participant and join the participant to the virtual meeting through a telecommunications channel. Alternatively, the HTTP call to the virtual meeting service may cause the virtual meeting service to directly connect the participant's computer device 402 to the virtual meeting if this is a preferred contact method specified by the participant or the moderator of the virtual meeting.

Figure 5:
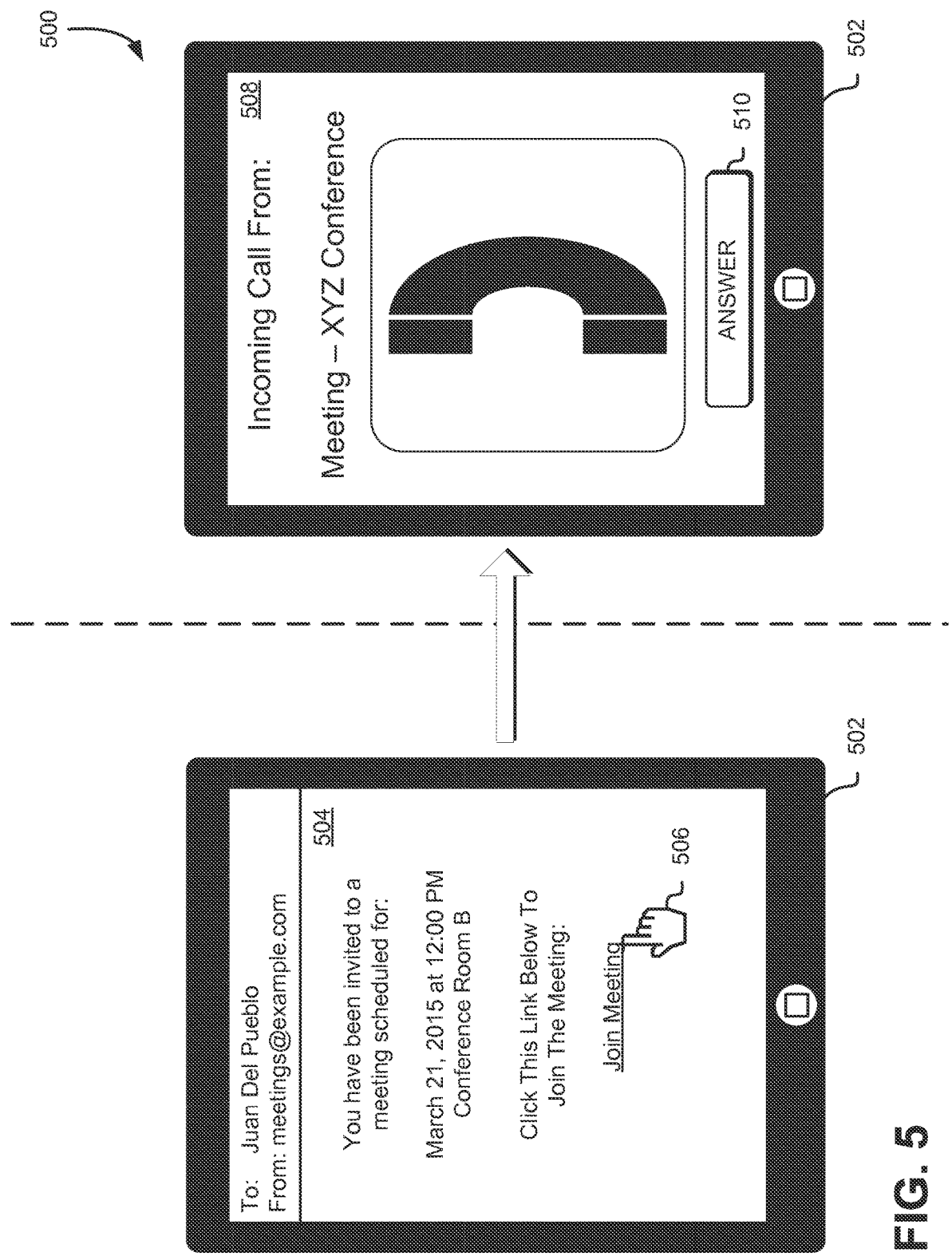
FIG. 5 shows an illustrative example of an environment in which a participant utilizes a link provided through a virtual meeting invitation to request attendance to a virtual meeting, resulting in the virtual meeting notice contacting the participant to enable the participant to join the virtual meeting in accordance with at least one embodiment.

As noted above, a virtual meeting participant may utilize a link included within a virtual meeting invitation message to transmit a request to a virtual meeting service to utilize a preferred contact method for the participant to contact the participant and enable the participant to join the virtual meeting (e.g., conference call). Accordingly FIG. 5 shows an illustrative example of an environment 500 in which a participant utilizes a link provided through a virtual meeting invitation to request attendance to a virtual meeting, resulting in the virtual meeting service contacting the participant to enable the participant to join the virtual meeting in accordance with at least one embodiment. In the environment 500, a participant may receive, through a messaging client application installed on his/her computing device 502, a virtual meeting invitation message 504, which may specify the date, time and physical location of the virtual meeting, as well as other important information and/or attachments (e.g., computer files, documents, etc.) that the participant may need to prepare for the virtual meeting.

The virtual meeting invitation message 504 may further include a link to the virtual meeting service, which the participant may select through use of a cursor 506 or other computing device 502 input device to cause the computing device 502 to access the virtual meeting service. The link may include a URL to the virtual meeting service, which may utilize an identifier included within the URL to identify the participant's preferred contact method for the virtual meeting (e.g., conference call, teleconference, etc.). This preferred contact method may be specified by the participant through an alternative link provided within the virtual meeting invitation message 504, such as the link described above in connection with FIG. 4. This alternative link may cause the computing device 502 to invoke a virtual meeting service application installed on the computing device 502 that may be configured to obtain a identifier from the alternative link and transmit a HTTP call to the virtual meeting service to enable the participant to specify his/her preferred contact method. Alternatively, the moderator of the virtual meeting, when configuring the virtual meeting, may specify a preferred contact method for each participant. This information may be stored within a participant's profile in the participant profile data store maintained by the virtual meeting service.

When the participant selects the link within the virtual meeting invitation message 504, the virtual meeting service may receive an HTTP call from the computing device 502, which may include the identifier for the participant. Upon receiving the HTTP call from the computing device 502, the virtual meeting service may utilize the identifier to identify the participant's preferred contact method and the virtual meeting the participant is attempting to join. Further, the virtual meeting service may identify any applicable policies related to the virtual meeting and the particular identifier to determine whether the participant may join the virtual meeting (e.g., conference call). For instance, if a policy specifies that only a certain number of participants may join the virtual meeting, the virtual meeting service may deny the participant's request to join the virtual meeting if this maximum number of participants has been reached. Additionally, the virtual meeting service may determine, based at least in part on the start time and duration of the virtual meeting, whether the participant may join the virtual meeting. For instance, if the participant has selected the link before the start time of the virtual meeting or after the virtual meeting has concluded, the virtual meeting service may deny the request to join the virtual meeting.

If the virtual meeting service determines that the participant may join the virtual meeting (e.g., conference call), the virtual meeting service may utilize the participant's preferred contact method to contact the participant and enable the participant to join the virtual meeting. For instance, as illustrated in FIG. 5, if the participant or moderator of the virtual meeting has specified that the virtual meeting service is to contact the participant's computing device 502 upon the participant's selection of the provided link, the virtual meeting service may contact the participant's computing device 502 through a telecommunications channel. Thus, the participant's computing device 502 may receive a telephone call, as illustrated in FIG. 5, from the telecommunications channel. The participant may select the answer button 510 to answer the telephone call from the telecommunications channel, thus joining the virtual meeting.

In some embodiments, if the participant is the first person to contact the virtual meeting service through the provided link, the virtual meeting service may transmit a notification to the moderator of the virtual meeting to open the telecommunications channel for the virtual meeting (e.g., conference call). This notification transmitted to the moderator through one or more computing devices used by the moderator may include a unique link to the virtual meeting service. The link may further include a unique identifier that may be utilized by the virtual meeting service to identify the moderator and any policies associated with the virtual meeting. The moderator may utilize this link to open the telecommunications channel and enable the virtual meeting service to utilize this telecommunications channel to contact any participants awaiting the start of the virtual meeting. This may enable these participants to join the virtual meeting.

In an alternative embodiment, when a participant selects the link within the virtual meeting invitation message 504, the virtual meeting service will connect the participant's computing device 502 to the telecommunications channel if the participant is authorized to join the virtual meeting. For instance, the link may include an identifier which may be associated with the virtual meeting and any policies associated with the participant and the virtual meeting itself. If, based at least in part on these policies, the participant is authorized to join the virtual meeting, the virtual meeting service may transmit an application programming interface (API) call to the computing device 502 to initiate a phone call to a phone number associated with the telecommunications channel. This may enable the participant to join the virtual meeting. However, if the participant is not authorized to join the virtual meeting, the virtual meeting service may deny the participant's request to join the virtual meeting.

Figure 6:
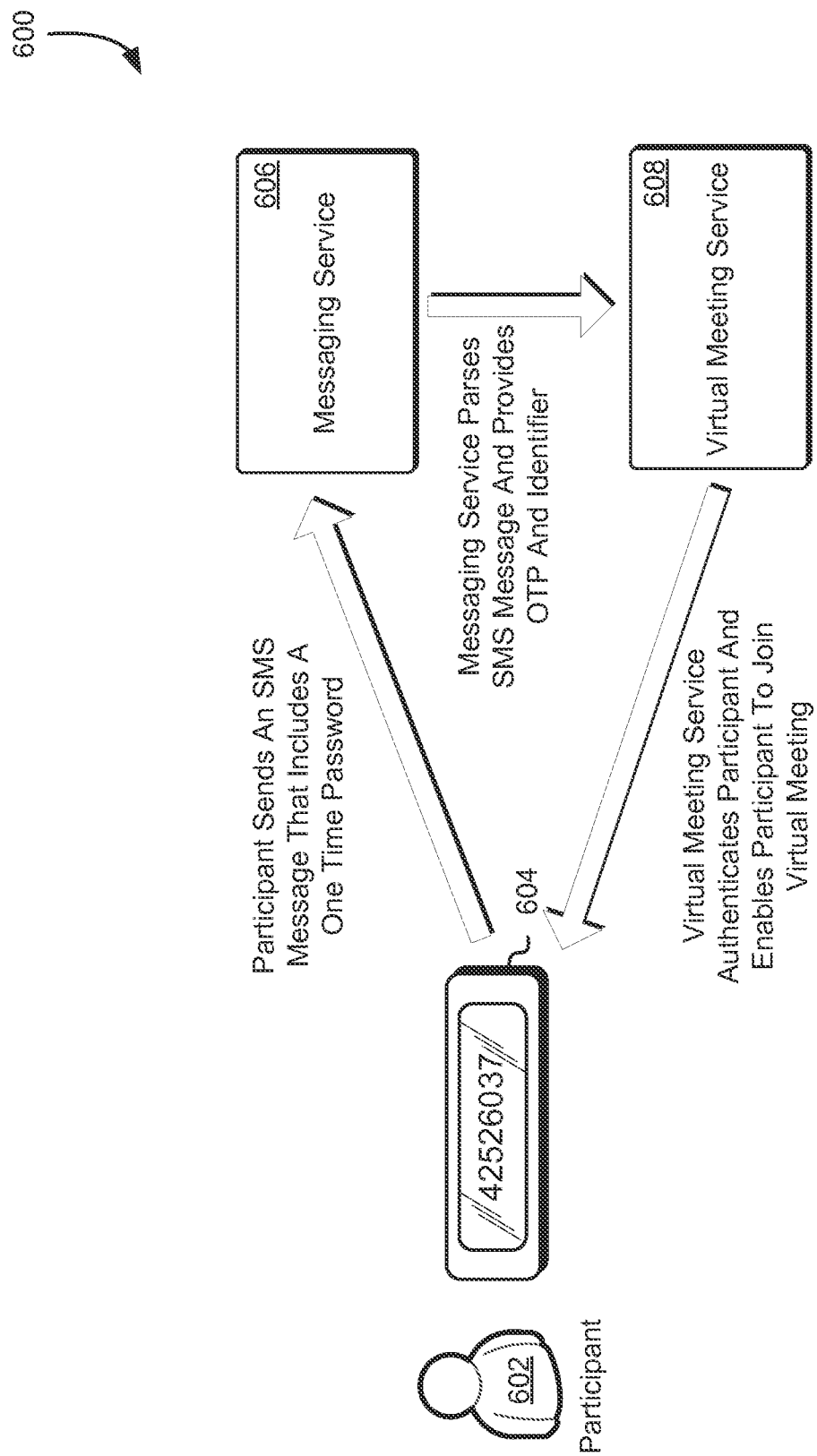
FIG. 6 shows an illustrative example of an environment in which a participant utilizes a one-time password (OTP) token to enable authentication of the participant and participation in a virtual meeting in accordance with at least one embodiment.

As noted above, in order for a participant to join a virtual meeting, he/she may be required to transmit an SMS message or other electronic message that includes a one-time password to a messaging service or directly to the virtual meeting service, which may utilize the one-time password to authenticate the participant. Accordingly, FIG. 6 shows an illustrative example of an environment 600 in which a participant utilizes a one-time password (OTP) token to enable authentication of the participant 602 and participation in a virtual meeting in accordance with at least one embodiment. In the environment 600, a participant 602 of a particular virtual meeting transmits a request to the virtual meeting service 608 to join the virtual meeting. For instance, the participant 602, through a computing device, may invoke a link, which may cause his/her computing device to transmit a unique participant identifier to the virtual meeting service 608. This identifier may be utilized to identify the target virtual meeting that the participant 602 wishes to join, as well as any applicable policies generated by the moderator of the virtual meeting.

In an embodiment, when the virtual meeting service 608 receives the participant's 602 request to join the meeting, the virtual meeting service 608 prompts the participant 602, through his/her computing device, to transmit an SMS message to a messaging service 606 that includes a one-time password from an OTP token 604 issued to the participant 602 by the virtual meeting service 608 or other authorized entity. The virtual meeting service 608 may associate this provided OTP token 604 with a participant identifier, which may also be provided within the SMS message to the messaging service 606. The OTP token 604 may be synchronized with a common seed such that the virtual meeting service 608 may determine the expected one-time password for the participant 602.

When the messaging service 606 receives the SMS message from the participant 602, the messaging service 606 may identify a phone number, e-mail address or other contact information for the participant 602 from the SMS message. Further, the messaging service 606 may parse the SMS message to obtain the participant's 602 identifier, the one-time password from the OTP token 604, and other information that may be included within the SMS message as desired (e.g., virtual meeting identifier, etc.). The messaging service 606 may transmit this information to the virtual meeting service 608, which may process the provided information to determine whether the participant 602 may join the requested virtual meeting.

In some embodiments, the virtual meeting service 608 may determine whether the provided one-time password matches an expected one-time password. The expected one-time password may be derived directly or indirectly from a common one-time password seed. For example, the virtual meeting service 608 may transmit a request to a distinct OTP service to determine whether the provided one-time password matches an expected one-time password generated using the common one-time password seed. For instance, the virtual meeting service 608 may transmit the participant's 602 identifier, along with the one-time password, to the OTP service for verification. The OTP service may utilize the participant's 602 identifier to identify the appropriate one-time password seed. The OTP service may subsequently utilize this one-time password seed to obtain an expected one-time password, which may be utilized to determine whether the provided one-time password from the participant 602 produces a match with this expected one-time password. If so, then the participant 602 may be authenticated. The OTP service may transmit a notification to the virtual meeting service 608 indicating whether the participant 602 has been authenticated or not. If the participant 602 cannot be authenticated, the virtual meeting service

608 may deny the participant's 602 request to join the virtual meeting. Alternatively, if the participant 602 has been authenticated, the virtual meeting service 608 may utilize the other provided information to identify a contact method for enabling the participant 602 to join the virtual meeting. For instance, the virtual meeting service 608 may utilize the provided participant 602 contact information to determine whether this information matches known contact information for the participant 602. If not, the virtual meeting service 608 may either deny the request to join the virtual meeting or identify a known contact method and utilize this known contact method to enable the participant 602 to join the virtual meeting.

If the participant 602 is the moderator of the virtual meeting, the moderator may transmit an SMS message to the messaging service 606 that includes the one-time password from the OTP token 604, an identifier associated with the moderator, and a virtual meeting identifier. The virtual meeting service 608, upon receiving the one-time password, moderator identifier and the virtual meeting identifier, may authenticate the moderator and determine whether a telecommunications channel for the virtual meeting may be initiated to enable participants to attend the virtual meeting. Further, if the moderator has previously provided a preferred contact method for enabling the moderator to participate in the virtual meeting, the virtual meeting service 608 may utilize this preferred contact method to contact the moderator and enable him/her to join the virtual meeting upon initialization of the telecommunications channel.

Figure 7:
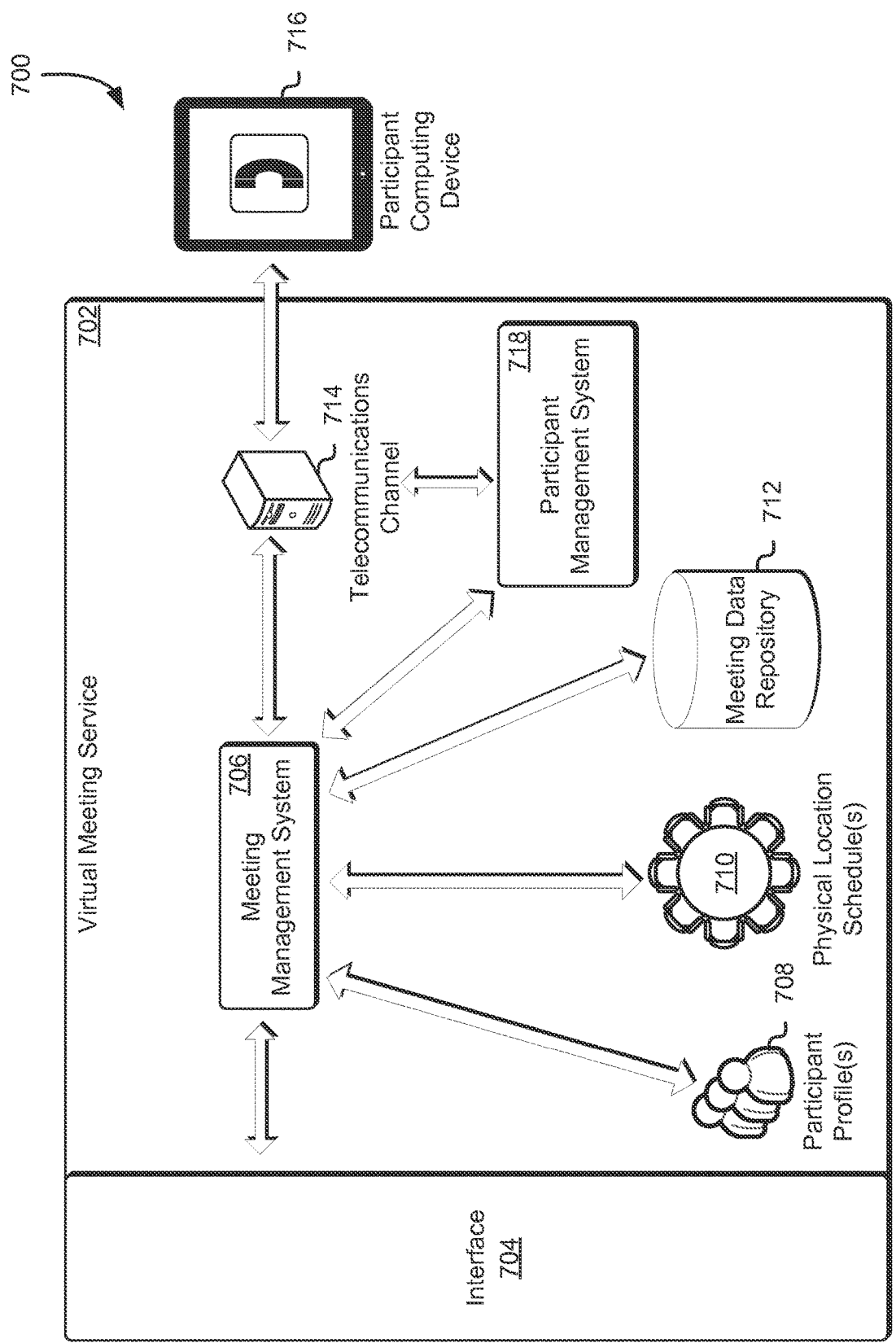
FIG. 7 shows an illustrative example of an environment in which various components of a virtual meeting service are collectively configured to enable virtual meetings among various users without need of these users to provide a conference identifier or PIN in accordance with at least one embodiment.

As noted above, a moderator of a virtual meeting may interact with a virtual meeting service to schedule and configure a virtual meeting (e.g., conference call, teleconference, etc.). This may include defining a time, place and location for the virtual meeting as well as the contact preferences and policies applicable to each participant to be invited to the virtual meeting. Additionally, participants may, in some cases, access the virtual meeting service to define their contact preferences. Each participant may then utilize a link in the virtual meeting invitation message that he/she receives to join the virtual meeting. Accordingly, FIG. 7 shows an illustrative example of an environment 700 in which various components of a virtual meeting service 702 are collectively configured to enable virtual meetings among various users without need of these users to provide a conference identifier or PIN in accordance with at least one embodiment.

In the environment 700, the virtual meeting service 702 may provide virtual meeting moderators and other customers with an interface 704, which these moderators may interact with in order to configure and schedule a virtual meeting (e.g., conference call) for any number of participants and define any policies and contact information for each of these participants. The moderator, through the interface 704 may further define global virtual meeting policies that may be used to define, among other things, a maximum number of participants that may join the virtual meeting. In an embodiment, some participants are permitted to utilize the interface 704 to define their contact preferences, which the virtual meeting service 702 may utilize to contact these participants once the virtual meeting has started or in response to these participants selecting a link provided within a virtual meeting invitation message. The interface 704 may include any of the GUI described above in connection with FIGS. 2-4.

When the virtual meeting moderator interacts with the interface 704 to schedule and configure a virtual meeting (e.g., conference call), the interface 704 may transmit a request to a meeting management system 706 to obtain information regarding other scheduled virtual meetings to ensure that no conflict is created upon scheduling of the virtual meeting. For instance, the meeting management system 706 may access a physical location schedule data store 710 to identify any physical location reservations. Additionally, the meeting management system 706 may access a meeting data repository 712 to identify any current virtual meeting reservations. The information garnered from the physical location schedule data store 710 and the meeting data repository 712 may be used to identify any available times, dates, and locations usable for a virtual meeting. For instance, as described above, when a moderator uses the interface 704 to schedule a virtual meeting, the interface 704 may obscure any unavailable times and dates from the various meeting time drop down menus. Additionally, once the moderator has selected an available virtual meeting time and date, the interface 704 may provide, to the moderator, a set of one or more physical locations that are available for the virtual meeting (e.g., conference call) and the associated telecommunications equipment included within these one or more physical locations. This may enable the moderator to select an appropriate physical location for the virtual meeting.

Through the interface 704, the moderator of a virtual meeting may also specify which participants are to be invited to the virtual meeting, as well as the preferred contact method for each participant. In some embodiments, the interface 704 may transmit a request to the meeting management system 706 to obtain information for any participants specified by the moderator that may have a profile within a participant profile data store 708. For instance, when the moderator selects a participant through the interface 704, the meeting management system 706 may access the participant profile data store 708 to identify a participant profile associated with the selected participant. If a profile is available, the meeting management system 706 may provide this information to the interface 704, which may enable the interface 704 to define one or more contact preference options for the participant that may be selected by the moderator. However, if a profile is not available for the selected participant, the moderator may provide contact information for the participant as well as any other information that may be used to generate a participant profile for the participant. The moderator may further determine whether he/she wants to define a contact preference for the participant or if the virtual meeting service 702 is to provide a link to the virtual meeting that, when selected by the participant, would cause the virtual meeting service 702 to connect the participant's computing device 716 to the virtual meeting.

Additionally, the moderator may utilize the interface 704 to define one or more policies that may be applicable to the virtual meeting (e.g., conference call), any participant authentication methods and permissible contact methods that may be utilized by one or more participants of the virtual meeting, and any number of participants invited to attend the virtual meeting. For instance, the moderator may specify a maximum number of participants that may attend the virtual meeting, thereby causing any additional participants attempting to join the virtual meeting to be denied access. Additionally, or alternatively, the moderator may define how many participants may utilize the same link to access the virtual meeting. For example, the moderator may create a policy for a participant that may specify that the participant may forward the virtual meeting invitation message to a number of other persons the participant deems necessary to participate in the virtual meeting. Further, since the virtual meeting invitation message forwarded by the participant to other persons may include the same link to the virtual meeting, the moderator may define a maximum number of times the link may be used to enable a user of the link to join the virtual meeting.

In some embodiments, the moderator of the virtual meeting may specify appropriate contact methods for any number of participants of the virtual meeting. For instance, the moderator may specify that no participant may utilize a public computing device to access the virtual meeting. Additionally, or alternatively, a moderator may specify that participants may not utilize certain applications to access the virtual meeting. Thus, if a participant attempts to join the virtual meeting using a public computing device or through use of a prohibited application, the participant management system 718 may deny the participant's request to join the virtual meeting. In some instances, if the only participant contact method is prohibited through any of these policies, the virtual meeting invitation transmitted to the participant may notify the participant to contact the moderator to identify a new contact method. Alternatively, if the moderator authorizes the participant to do so, the participant may utilize the virtual meeting service 702 to provide a new contact method that may be used to join the virtual meeting.

In addition to defining the appropriate contact methods for the participants of the virtual meeting, the moderator, through the interface 704, may further define valid subsets of a plurality of authentication mechanisms that are to be utilized by the participants to join the conference call. Thus, the participant management system 718 may utilize these authentication mechanisms to authenticate the identity of each conference call participant that requests to join the call. For instance, the moderator of the virtual meeting may require a particular subset of the plurality of authentication mechanisms for employees of the moderator than those for outside parties. For example, the moderator may require certain participants to provide a set of credentials and a one-time password generated through a one-time password token in order to access the virtual meeting. Alternatively, other participants may only be required to provide a set of credentials without the one-time password. Other participants may be required to provide not only a set of credentials but also a response to a Completely Automated Public Turing test to tell Computers and Humans Apart (CAPTCHA) challenge in order to enable authentication of the participant by the participant management system 718. When the moderator defines these appropriate contact methods and subsets of the set of authentication methods for the participants of the virtual meeting, the interface 704 may transmit this information to the meeting management system 706, which may access the participant profile data store 708 to update the participant profiles as needed.

The moderator of the virtual meeting, through the interface 704, may further define within a virtual meeting policy a plurality of virtual meeting functions that may be performed by a participant for the virtual meeting. For instance, the moderator may specify that a participant may act as a secondary moderator of the virtual meeting and initiate the telecommunications channel at the meeting start time. Alternatively, the moderator of the virtual meeting may specify, through the policy, which participants are authorized to transmit data to other participants, engage in discussion during the virtual meeting, and the like. The moderator may further specify, from a set of telecommunications channels 714 and for each participant and/or policies defined for the virtual meeting, the particular telecommunications channels 714 that may be used for the virtual meeting. For instance, a telecommunications channel 714 may be available only for participants that have administrative or moderator functions or roles within the virtual meeting. A separate telecommunications channel 714 may be established for participants of the virtual meeting that are only permitted to access the virtual meeting but not participate in the discussion. The set of authentication mechanisms, the set of telecommunications channels, and the plurality of conference call functions may be independently modifiable by changing the policy. Additionally, the plurality of authentication mechanisms, the plurality of telecommunications channels, and the plurality of conference call functions may be modifiable in concert through the configuration of the virtual meeting and/or the one or more policies defined by the moderator.

Once the moderator has configured the virtual meeting, the interface 704 may transmit the virtual meeting information to the meeting management system 706. The meeting management system 706 may access the participant profile data store 708 to modify any existing participant profiles to specify the preferred contact method for the participant. Alternatively, if no profile exists for a participant specified within the virtual meeting configuration, the meeting management system 706 may generate a new participant profile within the participant profile data store 708 to indicate this new participant's contact preferences and/or other information that may be utilized to identify the participant when he/she attempts to join the virtual meeting. The meeting management system 706 may further access the physical location schedule data store 710 to reserve a physical location and any telecommunications equipment at the physical location for the moderator if the moderator selected a physical location for the virtual meeting through the interface 704. The meeting management system 706 may access the meeting data repository 712 to store the virtual meeting information provided by the moderator, as well as any policies associated with the virtual meeting scheduled by the moderator.

The meeting management system 706 may generate one or more virtual meeting invitation messages for each participant specified by the moderator through the interface 704. Each virtual meeting invitation message may specify the time, date, and location of the virtual meeting (e.g., conference call) as scheduled by the moderator. Further, each virtual meeting invitation message may include a link that may be used to join the virtual meeting and/or specify a participant contact method preference. For instance, in an embodiment, if the participant has an employment relationship with the moderator and/or a service provider of the virtual meeting service 702, the link will be configured to cause the participant's computing device 716 to launch a virtual meeting service application installed on the participant computing device 716. This application may only be available to participants that have such a relationship with the moderator and/or the service provider of the virtual meeting service 702.

When the participant selects the link, the computing device 716 may invoke the virtual meeting service application, which may parse the link to obtain a unique identifier assigned to this particular invitation. The application may then generate a HTTP call to the virtual meeting service 702 to enable participant interaction with the virtual meeting service 702 through the computing device 716. The participant management system 718 may utilize the provided identifier to identify the associated virtual meeting, the policies in place for the virtual meeting, as well as the participants invited to attend the virtual meeting. Based at least in part on the provided identifier and the contact method utilized by the participant to access the virtual meeting service 702 (e.g., use of a participant computing device 716, etc.), the participant management system 718 may determine whether the participant is authorized to join the virtual meeting and/or specify alternative contact methods to be utilized by the virtual meeting service 702 for the participant. The participant may specify his/her contact method preference, which the virtual meeting service 702 may utilize to contact the participant once the virtual meeting has begun. The meeting management system 706 may obtain this participant preference through the participant management system 718 and may access the participant profile data store 708 to access the participant's profile and specify this preference within the profile. In some embodiments, the participant is required to provide authentication claim information to the participant management system 718 to join the virtual meeting and/or specify his/her preferred contact method. The participant management system 718, upon receiving this authentication claim information from the participant, may determine whether the provided authentication claim information is valid and is associated with the participant. If so, the participant management system 718 may transmit a request to the meeting management system 706 to identify any policies associated with the virtual meeting and the participant's profile to determine whether the participant is authorized to join the virtual meeting. If the participant is authorized to join the virtual meeting, the participant management system 718 may transmit a notification to the meeting management system 706 to enable the participant to join the virtual meeting and/or modify his/her contact information.

If the participant does not have an employment relationship with the moderator and/or a service provider of the virtual meeting service 702, the link may include a URL that, when selected, may cause the participant's computing device 716 to transmit a HTTP call to the virtual meeting service 702 to enable the participant to join the virtual meeting. The link may also include an identifier, which the virtual meeting service 702 may use to determine whether the participant may join the virtual meeting or not. For instance, the meeting management system 706 may access the meeting data repository 712 to identify the start time for the virtual meeting. If the participant has selected the link prior to this start time, the meeting management system 706 may deny the participant's request to join the virtual meeting.

When the virtual meeting start time arrives, the moderator may utilize his/her virtual meeting service application to transmit a request to the meeting management system 706 to initiate the plurality of telecommunications channels 714 for the virtual meeting (e.g., conference call). This plurality of telecommunications channels 714 may be used by the various participants and the moderator to participate in the virtual meeting and exchange information as needed. Once the set of telecommunications channels 714 has been opened and the virtual meeting has begun, participants may utilize the links provided within their respective virtual meeting invitation messages to join the virtual meeting. For instance, when a participant selects the link, the participant's computing device 716 may transmit a HTTP call, including the identifier from the link, to the virtual meeting service 702, which may utilize the identifier to identify the particular virtual meeting the participant wishes to join and the participant's contact preferences.

If the plurality of telecommunications channels 714 has been opened and the virtual meeting has begun, the participant management system 718 may attempt to authenticate the participant. For instance, when the participant uses his/her participant computing device 716 to join the virtual meeting, the participant management system 718 may cause the participant computing device 716 to prompt the participant to enter authentication claim information usable by the participant management system 718 to authenticate the identity of the participant. The participant management system 718 may receive this authentication claim information and determine, based at least in part on the one or more policies of the conference call and the authentication claim information received from the participant via the participant computing device 716, whether the authentication claim information satisfies a valid subset of the plurality of authentication mechanisms sufficient for joining the conference call has been satisfied. For example, if the participant management system 718 determines that the participant is required to provide a set of credentials and a one-time password in order to enable authentication of the participant, the participant management system 718 may prompt the participant, through his/her participant computing device 716 to provide the set of credentials and the one-time password necessary for authentication. It should be noted that the plurality of valid subsets of the plurality of authentication mechanisms are independently modifiable by the moderator of the virtual meeting. This may enable the moderator to add or remove authentication mechanisms and valid subsets of the authentication mechanisms by changing the one or more policies of the virtual meeting.

If the participant management system 718 determines that the authentication claim information satisfies a valid subset of the plurality of authentication mechanisms, the participant management system 718 may authenticate the participant. Once the participant has been successfully authenticated, the participant management system 718 may determine, based at least in part on the one or more policies associated with the virtual meeting, the identity of the participant, and the valid subset of the plurality of authentication mechanisms whether the participant is authorized to join the virtual meeting utilizing the participant computing device 716 through which the participant has requested to join the virtual meeting. For instance, if the participant is attempting to access the virtual meeting through a public telephone or a public computing system/network, the participant management system 718 may determine whether the particular participant is authorized to join the virtual meeting through these public means. If the participant is not authorized to do so, the participant management system 718 may deny the participant's request and notify the participant that he/she must utilize a non-public method to join the virtual meeting. Additionally, the participant management system 718 may determine a particular telecommunications channel of the plurality of telecommunications channels authorized by the policy to join the participant computing device to the conference call. For instance, if the participant is authorized to join the virtual meeting, the participant management system 718 may transmit a request to the meeting management system 706 to utilize the participant's preferred contact method to identify the particular telecommunications channel 714 that is authorized to contact the participant and enable the participant to join the virtual meeting (e.g., conference call).

In some embodiments, once the set of telecommunications channels 714 has been opened, the meeting management system 706 may access the participant profile data store 708 to identify the preferred contact method for each participant of the virtual meeting. Subsequently, the meeting management system 706 may transmit a request to the set of telecommunications channels 714 to cause particular telecommunications channels 714, subject to the one or more policies of the conference call, to contact one or more participants through the defined preferred contact methods specified in the participant profile data store 708. This may enable these participants to respond to the phone call from the particular telecommunications channels 714 and join the virtual meeting without need to utilize the provided link to join the virtual meeting.

If a participant utilizes the provided link to join the virtual meeting at the meeting start time but the set of telecommunications channels 714 has not been opened by the moderator of the meeting, the meeting management system 706 may transmit one or more notifications to the moderator indicating that he/she is required to open the set of telecommunications channels 714 to start the virtual meeting. The one or more notifications may include a link to either a virtual meeting service application installed on the moderator's computing device capable of transmitting HTTP calls to the virtual meeting service 702 or to the virtual meeting service interface 704 itself to enable the moderator to submit a request to initiate the telecommunications channel 714 for the virtual meeting. The link may include a unique identifier, which the meeting management system 706 may utilize to identify the virtual meeting and any configuration information that may be utilized to configure the set of telecommunications channels 714. Once the telecommunications channels 714 have been opened, any participants that have been on hold waiting for the virtual meeting to begin may be connected to the telecommunications channel 714 and joined to the virtual meeting.

When a participant computing device joins the conference call through the particular telecommunications channel, the participant management system 718 may determine, based at least in part on the applicable one or more policies associated with the conference call, the identity of the participant, and the particular telecommunications channel, a subset of the plurality of functions that the participant computing device, the participant, or both, are authorized to perform during the conference call. The participant management system 718 may, for each participant computing device 716 and/or participant, regulate performance of the one or more conference call functions according to the virtual meeting policies. For instance, if a particular participant is authorized to act as a secondary moderator of the virtual meeting, the participant management system 718 may regulate this participant's performance of his/her delegated moderator functions. Alternatively, if a participant is not authorized to transmit data to other participants in the virtual meeting, the participant management system 718 may prevent the participant from transmitting data to other participants. It should be noted that the plurality of conference call functions and authorized conference call functions of the plurality of conference call functions may be independently modifiable to add or remove conference call functions and authorized conference functions by changing the one or more policies.

Figure 8:
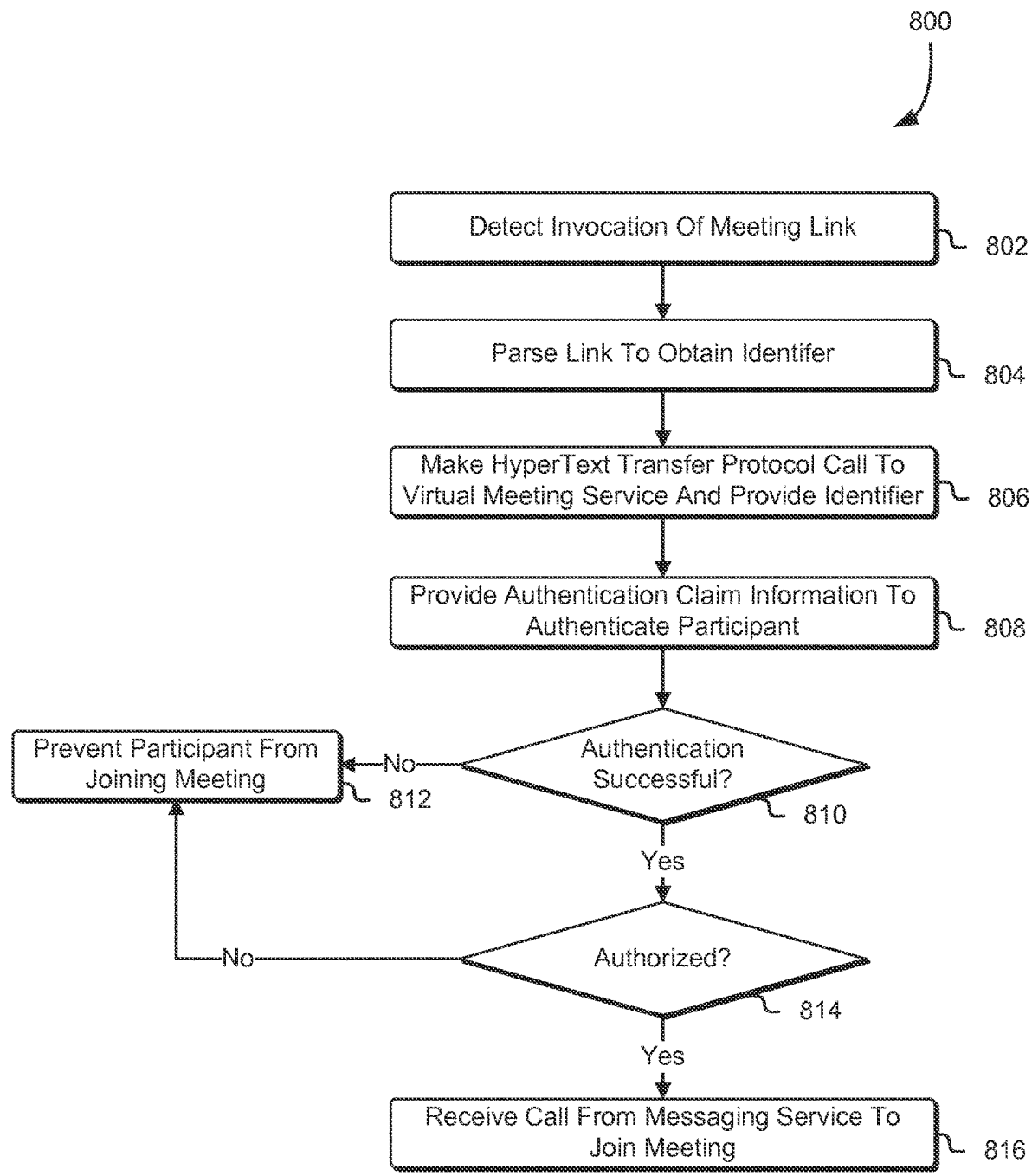
FIG. 8 shows an illustrative example of a process for utilizing an invocation of a virtual meeting link to enable a virtual meeting service to utilize a preferred contact method to allow a participant of a virtual meeting to join the virtual meeting in accordance with at least one embodiment.

As noted above, a participant may receive a virtual meeting invitation message that includes a link usable to join a virtual meeting (e.g., conference call) once the virtual meeting has begun. Invocation of this link may cause the participant's computing device to either launch a virtual meeting service application, which may be configured to interact with the virtual meeting service to join the participant to the virtual meeting or communicate directly with the virtual meeting service to join the participant to the virtual meeting. Accordingly, FIG. 8 shows an illustrative example of a process 800 for utilizing an invocation of a virtual meeting link to enable a virtual meeting service to utilize a preferred contact method to allow a participant of a virtual meeting to join the virtual meeting in accordance with at least one embodiment. The process 800 may be performed by the virtual meeting service application installed on the participant's computing device or by the computing device itself if the application is not available.

When a moderator of a virtual meeting utilizes a virtual meeting service to configure a virtual meeting, the moderator may specify, for each participant that is to be invited to the virtual meeting, a preferred contact method for the participant. The virtual meeting service may utilize this preferred contact method to contact the participant once the virtual meeting has started or await a triggering even before contacting the participant through this preferred contact method. Once the virtual meeting has been configured, the virtual meeting service may provide, to each participant, a virtual meeting invitation message, which may specify the date, time, and location of the virtual meeting. Further, the message may include a unique link, which the participant may utilize to specify that he/she wishes to join the virtual meeting. At any time, the participant may invoke this link to transmit a request to the virtual meeting service to join the virtual meeting. Thus, the participant's computing device or the application may detect 802 invocation of the virtual meeting link provided within the virtual meeting invitation message.

Once the computing device or the application detects the invocation of the virtual meeting link, the computing device or the application may parse 804 the link to obtain an identifier for the participant that may be included with the link and make 806 a HTTP call to the virtual meeting service that includes the identifier obtained from the parsed link. The virtual meeting service may utilize the provided identifier to identify the virtual meeting (e.g., conference call) associated with the identifier provided, as well as any participant and virtual meeting policies that may be applicable. For instance, the virtual meeting service may determine whether the virtual meeting has begun. If the request to join the virtual meeting is received at a time prior to the start time for the virtual meeting, the virtual meeting service may reject the participant's request to join the virtual meeting. In some embodiments, the virtual meeting service may evaluate the one or more policies associated with the virtual meeting to determine whether the participant may join the virtual meeting. For example, a moderator may create a policy whereby only a certain number of participants may attend the virtual meeting. If the virtual meeting service determines that the maximum number of participants have joined the virtual meeting, the virtual meeting service may reject any subsequent requests from other participants to join the virtual meeting. Additionally, or alternatively, the virtual meeting service may maintain policies specific to the identifier provided to the participant invited to attend the virtual meeting. For instance, a moderator may specify that a link within an invitation sent to the participant may be utilized a maximum number of times before the link is no longer valid for joining the virtual meeting. Thus, the virtual meeting service may determine whether the particular identifier has previously been used and, if so, whether the maximum amount of uses has previously been reached. If so, the virtual meeting service may reject the participant request to join the virtual meeting.

As noted above, in addition to the identifier, a participant may provide a authentication claim information usable to authenticate the participant and serve as a factor in determining whether the participant may participate in the virtual meeting. For instance, the virtual meeting service may transmit a request to the participant to provide the authentication claim information that may be utilized to authenticate the participant. Thus, the computing device or application may obtain, from the participant, authentication claim information and provide 808 the participant's provided authentication claim information to the virtual meeting service to authenticate the participant. For instance, the virtual meeting service may transmit the provided authentication claim information to a participant management system, which may include one or more data stores for sets of credentials of participants, moderators and other users of the virtual meeting service. This participant management system may utilize the provided authentication claim information to identify any matching credentials within these data stores. Further, the participant management system may determine whether this authentication claim information was provided through an expected source (e.g., a participant computing device known to the virtual meeting service, etc.). Upon evaluation of the provided authentication claim information, the participant management system may transmit a notification to the virtual meeting service that may indicate whether the participant has been authenticated. The virtual meeting service may then provide a notification to the computing device or application, which may utilize the notification to determine 810 whether authentication of the participant is successful or not.

If the authentication of the participant is not successful, the computing device or application may prevent 812 the participant from joining the virtual meeting, as the virtual meeting service cannot verify the identity of the participant submitting the request to join the virtual meeting. However, if the authentication of the participant is successful, the application or computing device may determine 814 whether the participant is authorized to join the particular virtual meeting. For instance, the participant management system, upon determining that the participant has been authenticated, may identify one or more policies that are applicable to the virtual meeting. These one or more policies may specify, among other things, the permissible contact methods for the virtual meeting, the permissible contact methods for each participant of the virtual meeting, the number of participants permitted to attend the virtual meeting, the number of meeting link invocations permitted before the link is rendered invalid, and the like. If, based at least in part on these policies, the participant is authorized to participate in the virtual meeting, the computing device or application may receive 814 a call from the virtual messaging service to join the virtual meeting. For instance, the virtual meeting service may transmit a request to an opened telecommunications channel to contact the participant through the computing device to enable the participant to join the meeting. Alternatively, the virtual meeting service may identify the preferred contact method for the participant, which may be different from the participant's computing device, and may cause the telecommunications channel to contact the participant through this preferred contact method. In an embodiment, the virtual meeting service will simply connect the participant's computing device to the open telecommunications channel, enabling the participant to be automatically joined to the virtual meeting. However, if the participant is not authorized to join the virtual meeting by virtue of the one or more applicable meeting policies, the computing device or application may prevent 812 the participant from joining the virtual meeting.

Figure 9:
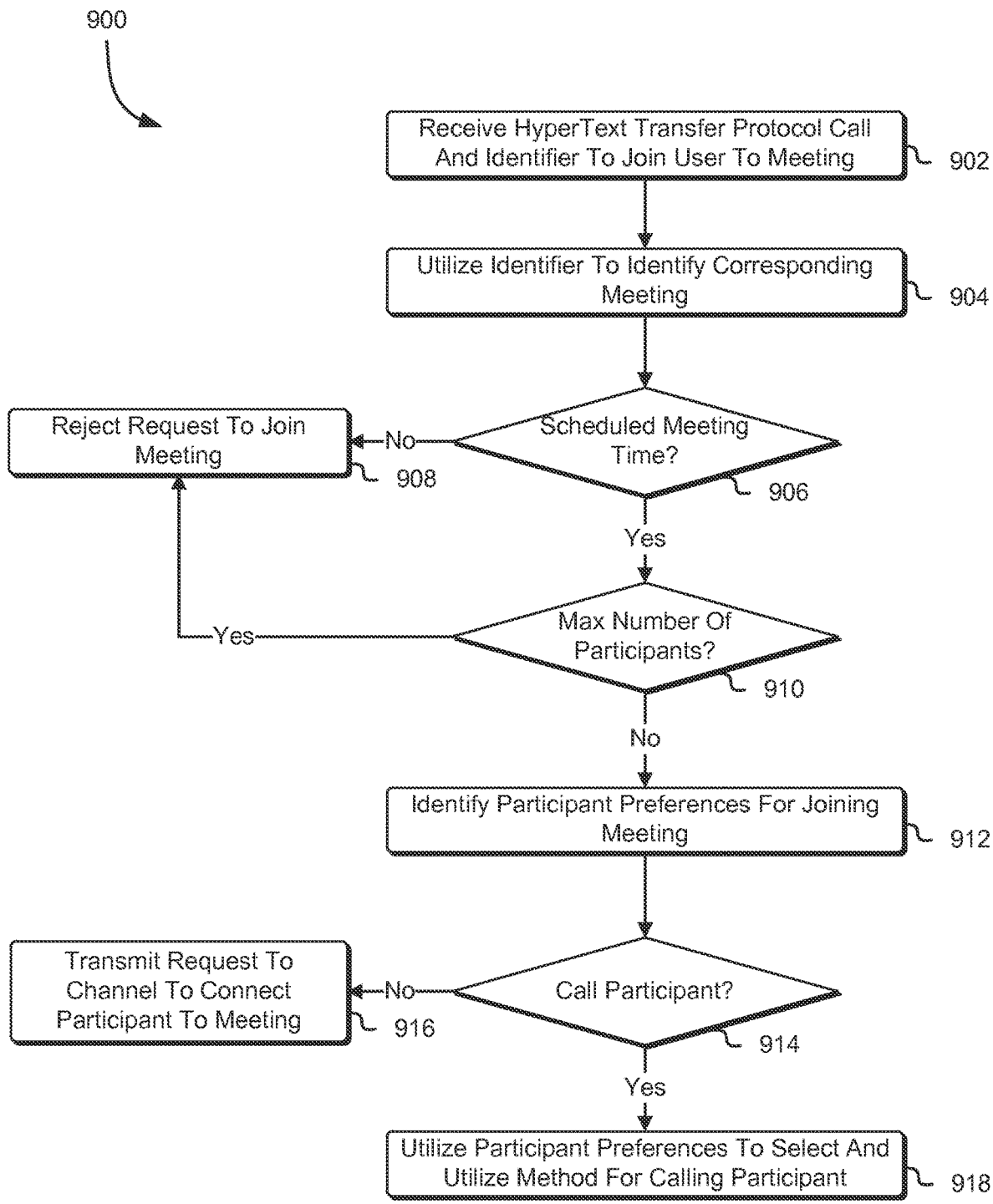
FIG. 9 shows an illustrative example of a process for determining, based at least in part on a received HyperText Transfer Protocol (HTTP) call, whether to contact a virtual meeting participant to enable the participant to attend a virtual meeting in accordance with at least one embodiment.

As noted above, the virtual meeting service may receive a request from a participant to join a virtual meeting (e.g., conference call). This request may be provided to the virtual meeting service through a HTTP call to the service made by the participant's computing device or an application installed on the device configured to interact with the virtual meeting service. The virtual meeting service may subsequently determine whether the participant may join the virtual meeting and, if so, determine the preferred contact method for the participant, which may be used to contact the participant and enable the participant to join the virtual meeting. Accordingly, FIG. 9 shows an illustrative example of a process 900 for determining, based at least in part on a received HTTP call, whether to contact a virtual meeting participant to enable the participant to attend a virtual meeting in accordance with at least one embodiment. The process 900 may be performed by the aforementioned virtual meeting service, which may be configured to receive and process HTTP calls made by a participant's computing device or a virtual meeting service application installed on the participant's computing device.

At any time, the virtual meeting service may receive 902 an HTTP call, which may include an identifier for a participant, to enable the participant to join a virtual meeting (e.g., conference call). The HTTP call may be generated by the participant's computing device as a result of the participant selecting a link included within a virtual meeting invitation message transmitted by the virtual message service upon configuration of the virtual meeting. The link may include the identifier, which may be unique to the participant or the invitation if the virtual meeting service has permitted the recipient to forward the invitation to others. When the virtual meeting service receives the HTTP call from the participant's computing device or application, the virtual meeting service may utilize 904 the provided identifier to identify the corresponding virtual meeting, any applicable virtual meeting and participant policies, and the participant's preferred contact method (if provided).

Once the virtual meeting service has utilized the identifier to identify the corresponding virtual meeting, the virtual meeting service may determine 906 whether it is the scheduled start time for the virtual meeting. If it is not the scheduled start time for the virtual meeting (e.g., conference call), the virtual meeting service may reject 908 the participant's request to join the virtual meeting, as the virtual meeting has not started and the telecommunications channel is not available for the virtual meeting. However, if the virtual meeting has begun and the telecommunications channel has been opened by the moderator or the virtual meeting service, the virtual meeting service may determine 910, based at least in part on a policy applicable to the virtual meeting, whether a maximum number of participants have already joined the virtual meeting. The virtual meeting service may transmit a request to the telecommunications channel to determine the current participant connections to the virtual meeting to identify the current number of participants. If this number matches the maximum number of participants permitted to participate in the virtual meeting, the virtual meeting service may reject 908 the participant's request to join the virtual meeting (e.g., conference call).

It should be noted that in some embodiments, the virtual meeting service may evaluate additional policies to determine whether to reject the participant's request to join the virtual meeting. For instance, the virtual meeting service may evaluate a policy specific to the identifier, which may specify a total number of times the same identifier may be utilized to access a virtual meeting. For instance, if a participant has forwarded the virtual meeting invitation message to a number of other users, only a set number of users, including the participant, may utilize the same link to join the virtual meeting. Thus, if a maximum number of users have utilized the link, rendering the identifier invalid, the virtual meeting service may reject any subsequent requests to join the virtual meeting if the requests include this now invalid identifier.

If the participant is authorized to join the virtual meeting (e.g., conference call), the virtual meeting service may identify 912 any participant contact method preferences that may be used to enable the participant to join the virtual meeting. For instance, the virtual meeting service may utilize the provided identifier to identify the participant's profile within the participant profile data store. The participant's profile may specify the preferred contact method for the participant as specified by either the moderator of the virtual meeting when creating the virtual meeting or by the participant at any time prior to the start of the virtual meeting. In some embodiments, the participant's profile may not specify a preferred contact method, in which case the virtual meeting may utilize the computing device used to transmit the request to join the virtual meeting as the default contact method for the participant.

Based at least in part on the preferred contact method specified within the participant's profile, the virtual meeting service may determine 914 whether to transmit a request to the telecommunications channel to call the participant through the specified preferred contact method. If the virtual meeting service determines, based at least in part on the participant's specified preferences that the virtual meeting service is not to call the participant, the virtual meeting service may transmit 916 a request to the telecommunications channel to connect the participant's computing device to the virtual meeting. This may cause the computing device to receive a phone number for the channel, which may be utilized automatically to connect the computing device to the channel. Alternatively, if the virtual meeting service determines that the telecommunications channel is required to call the participant through the preferred contact method, the virtual meeting service may utilize 918 the participant's preferences to select a preferred contact method and provide this contact method to the telecommunications channel to enable the channel to contact the participant. In some embodiments, the telecommunications channel may be provided with a variety of contact methods, each of which may be sorted based on participant preference. This may enable the telecommunications channel to utilize alternative contact methods if the preferred method cannot be used successfully to enable the participant to join the virtual meeting.

Figure 10:
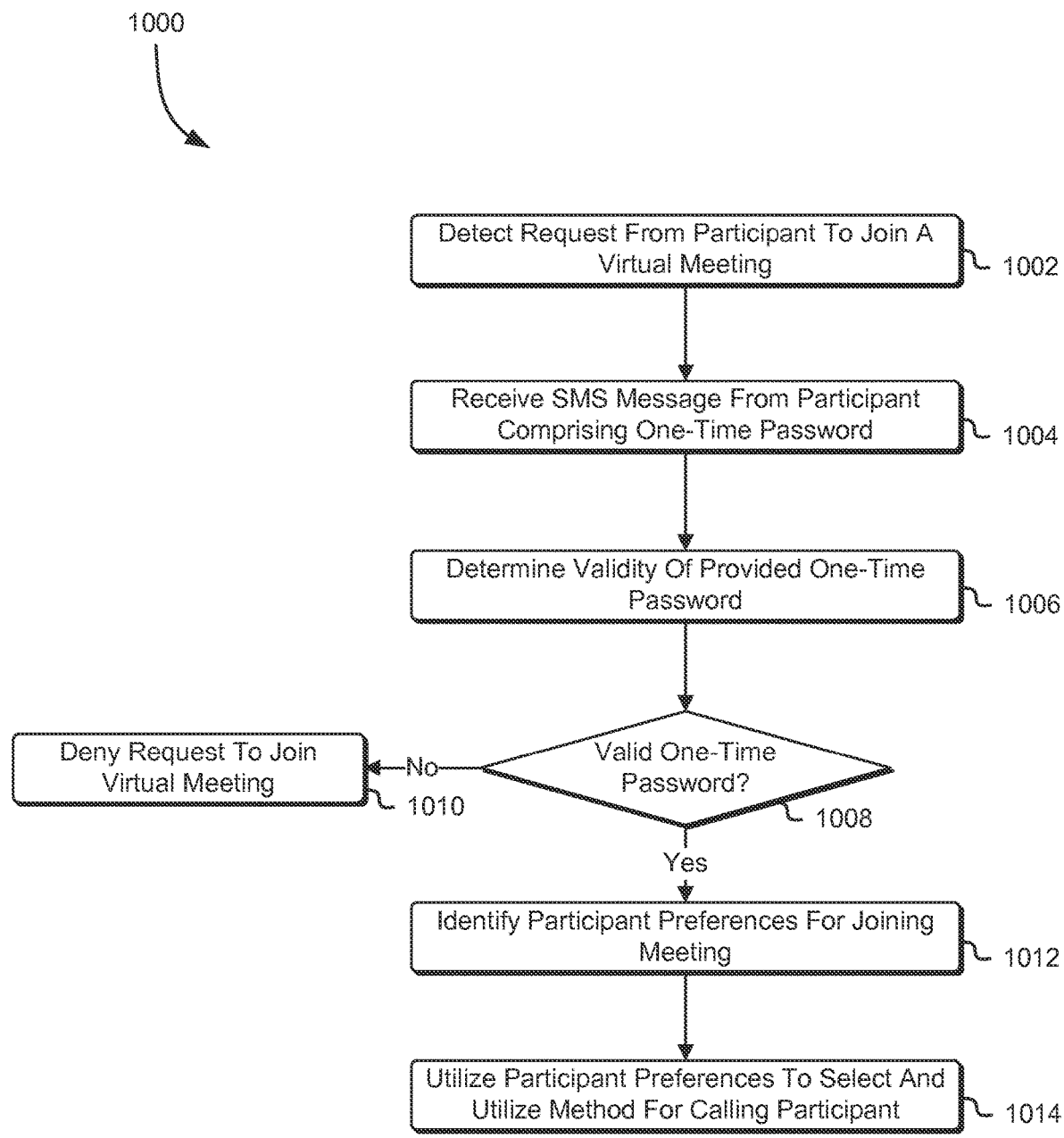
FIG. 10 shows an illustrative example of a process for determining, based at least in part on a received Short Message Service (SMS) message that includes an OTP for a participant, whether to enable the participant to attend a virtual meeting in accordance with at least one embodiment.

As noted above, in order for a participant or moderator to join a virtual meeting, he/she may be required to transmit an SMS message or other electronic message that includes a one-time password to a messaging service or directly to the virtual meeting service, which may utilize the one-time password to authenticate the participant. Accordingly, FIG. 10 shows an illustrative example of a process 1000 for determining, based at least in part on a received SMS message that includes a one-time password for a participant, whether to enable the participant to attend a virtual meeting in accordance with at least one embodiment. The process 1000 may be performed by a virtual meeting service in conjunction with a messaging service, which may receive and parse any received SMS messages from a participant or moderator of a virtual meeting. The virtual meeting service may perform several operations to authenticate the participant or moderator and enable the participant or moderator to join the desired virtual meeting.

At any time, the virtual meeting service may detect 1002, from a participant computing device or application installed on the computing device, a request from a virtual meeting participant to join a virtual meeting. The request may include one or more identifiers, such as a participant identifier, a virtual meeting identifier, and other identifiers that may be used to identify the participant and the virtual meeting that the participant wishes to attend. For instance, the virtual meeting service may receive an HTTP call, which may include an identifier for a participant, to enable the participant to join a virtual meeting (e.g., conference call). The HTTP call may be generated by the participant's computing device as a result of the participant invoking a link included within a virtual meeting invitation message transmitted by the virtual message service upon configuration of the virtual meeting.

Once the virtual meeting service has detected this request from the participant to join the virtual meeting, the virtual meeting service may transmit a request to the participant's computing device or application installed on the computing device for a one-time password generated using an OTP token previously provided to the participant by the virtual meeting service or other authorized entity. In order for the participant to provide the one-time password from the OTP token to the virtual meeting service, he/she may be required to transmit an SMS message that includes the one-time password and other participant information (e.g., participant identifier, virtual meeting identifier, etc.) to a messaging service. Thus, the messaging service may receive 1004 an SMS message from the participant comprising the one-time password and other identifiers usable to authenticate the participant.

The messaging service may parse the received SMS message to obtain the one-time password and the one or more identifiers. In some embodiments, the messaging service transmits the one-time password and the one or more identifiers to the virtual meeting service, which may utilize this information to determine 1006 the validity of the provided one-time password. For instance, the virtual meeting service may transmit the one-time password and the participant identifier to an OTP service, which may utilize the participant identifier to identify a common one-time password seed to identify the expected one-time password that should have been generated by the participant's OTP token. Thus, if the provided one-time password does not match the expected one-time password generated using the common one-time password seed, the provided one-time password may not be valid. Alternatively, if the provided one-time password does match the expected one-time password, the provided one-time password may be valid. The OTP service may provide a notification that includes its determination of the validity of the one-time password to the virtual meeting service.

Based at least in part on the notification from the OTP service, the virtual meeting service may determine 1008 whether the participant has provided a valid one-time password. If the participant has not provided a valid one-time password, the virtual meeting service may deny 1010 the participant's request to join the virtual meeting as the virtual meeting service may not be able to authenticate the participant. Alternatively, if the provided one-time password is valid, the virtual meeting service may identify 1012 the participant's preferences for joining the virtual meeting. For instance, the virtual meeting service may utilize the provided identifier to identify the participant's profile within the participant profile data store. The participant's profile may specify the preferred contact method for the participant as specified by either the moderator of the virtual meeting when creating the virtual meeting or by the participant at any time prior to the start of the virtual meeting. In some embodiments, the participant's profile may not specify a preferred contact method, in which case the virtual meeting may utilize the computing device used to transmit the request to join the virtual meeting as the default contact method for the participant.

Once the virtual meeting service has identifies the participant's preferences for joining the virtual meeting, the virtual meeting service may utilize 1014 the participant's preferences to select a preferred contact method and provide this contact method to the telecommunications channel to enable the channel to contact the participant. In some embodiments, the telecommunications channel may be provided with a variety of contact methods, each of which may be sorted based on participant preference. This may enable the telecommunications channel to utilize alternative contact methods if the preferred method cannot be used successfully to enable the participant to join the virtual meeting. In an embodiment, if the participant is a moderator of the virtual meeting and the telecommunications channel has not been established, the virtual meeting service may activate the telecommunications channel for the virtual meeting and utilize 1014 the moderator's preferences to select and utilize a preferred method for contacting the moderator upon activation of the telecommunications channel.

Figure 11:
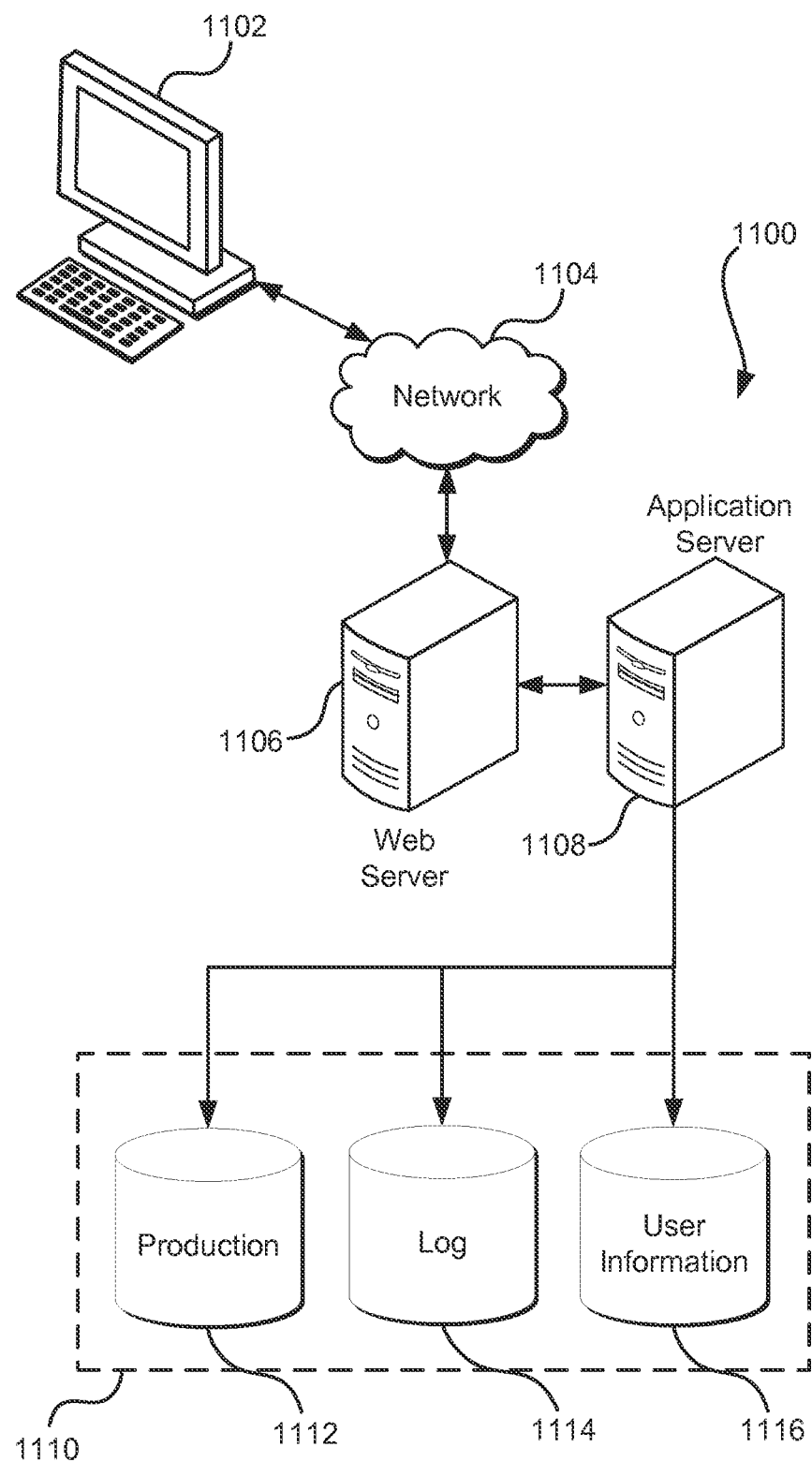
FIG. 11 shows an illustrative example of an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:
1. A computer-implemented method, comprising:
receiving, from a participant computing device associated with a conference call participant, a request to join a conference call, the request including an identifier associated with the conference call;
utilizing the identifier associated with the conference call to identify a policy of the conference call, the policy specifying a plurality of valid subsets of a plurality of authentication mechanisms that can be used to authenticate an identity of the conference call participant, a plurality of telecommunications channels that can be used to join the conference call, and a plurality of conference call functions that can be performed for the conference call;

causing the participant computing device to prompt the conference call participant to enter authentication claim information to authenticate the identity of the conference call participant;

determining, based at least in part on the policy associated with the conference call and the authentication claim information received from the conference call participant via the participant computing device, whether the authentication claim information satisfies a valid subset of the plurality of authentication mechanisms and whether the authentication claim information entered via the participant computing device is in a location associated with malicious activity, wherein the plurality of authentication mechanisms and the plurality of valid subsets of the plurality of authentication mechanisms are independently modifiable to add or remove authentication mechanisms and valid subsets by changing the policy;

responsive to determining that the authentication claim information satisfies a valid subset of the plurality of authentication mechanisms and that the participant computing device is not in the location associated with malicious activity, authenticating the identity of the conference call participant;

determining, based at least in part on the policy associated with the conference call, the identity of the conference call participant, and the valid subset of the plurality of authentication mechanisms, a particular telecommunications channel of the plurality of telecommunications channels authorized by the policy to join the participant computing device to the conference call, wherein the plurality of telecommunications channels and authorized telecommunications channels of the plurality of telecommunications channels are independently modifiable to add or remove telecommunications channels and authorized telecommunications channels by changing the policy;

joining the participant computing device to the conference call using the particular telecommunications channel;

determining, based at least in part on the policy associated with the conference call, the identity of the conference call participant, and a first subset of the plurality of conference call functions authorized for use on the particular telecommunications channel used to join the participant computing device to the conference call, a second subset of the plurality of conference call functions that the participant computing device, the conference call participant, or both, are authorized to perform during the conference call, wherein the plurality of conference call functions and authorized conference call functions of the plurality of conference call functions are independently modifiable to add or remove conference call functions and authorized conference call functions by changing the policy; and regulating, for the conference call, performance of the second subset of the plurality of conference call functions by the participant computing device, the conference call participant, or both, in accordance with the policy.

2. The computer-implemented method of claim 1, wherein the policy associated with the conference call specifies a maximum number of participants that can join the conference call such that any requests to join the conference call once the maximum number of participants have joined the conference call will be denied.

3. The computer-implemented method of claim 1, wherein the policy associated with the conference call specifies a maximum number of times the identifier associated with the conference call can be utilized before the identifier becomes invalid for use in requesting to join the conference call.

4. The computer-implemented method of claim 1, wherein the method further comprises:

receiving, from the participant computing device in response to the conference call participant having entered authentication claim information into the participant computing device, a Short Message Service message that includes a one-time password generated using a one-time password token associated with the participant computing device; and determining, based at least in part on the generated one-time password, whether the authentication claim information received from the conference call participant via the participant computing device satisfies the valid subset of the plurality of authentication mechanisms.

5. The computer-implemented method of claim 1, wherein the plurality of authentication mechanisms, the plurality of telecommunications channels, and the plurality of conference call functions are modifiable in concert.

6. The computer-implemented method of claim 1, wherein the first subset of the plurality of conference call functions authorized for use on the particular telecommunications channel and the second subset of the plurality of conference call functions that are authorized to perform during the conference call are independently modifiable based at least in part on the configurations of the virtual meeting or one or more policies defined by the moderator.

7. The computer-implemented method of claim 1, further comprising denying the participant computing device from accessing the conference call if the participant computing device is in a location with malicious activity.

8. A system, comprising:
one or more processors; and
memory including instructions that, as a result of being executed by the one or more processors, cause the system to:
receive a request to join a virtual meeting, the request including an identifier associated with the virtual meeting;
use the identifier to identify a policy of the virtual meeting, the policy specifying a plurality of virtual meeting functions that can be performed for the virtual meeting;
determine, based at least in part on the policy, one or more authentication methods to be performed in order to authenticate a participant of the virtual meeting, wherein the one or more authentication methods are independently modifiable to add or remove authentication mechanisms by changing the policy;
receive authentication claim information associated with the participant;
determine whether the participant is in a location associated with malicious activity;
use the authentication claim information to identify at least one participant contact method usable by a particular telecommunications channel of a plurality of telecommunications channels to contact a computing device of the participant;

determine, based at least in part on the policy and the location of the participant, whether the participant is authorized to join the virtual meeting using the computing device;

determine, based at least in part on the policy, an identity of the participant, and a first subset of the plurality of virtual meeting functions authorized for use on the particular telecommunications channel, a second subset of the plurality of virtual meeting functions that the computing device, the participant, or both, are authorized to perform during the virtual meeting, wherein the plurality of virtual meeting functions and authorized virtual meeting functions of the plurality of virtual meeting functions are independently modifiable to add or remove virtual meeting functions and authorized virtual meeting functions by changing the policy; and enable the particular telecommunications channel to contact the computing device of the participant to connect the computing device to the virtual meeting.

9. The system of claim 8, wherein the instructions further cause the system to:

determine, based at least in part on the policy, an identity of the participant, and the one or more authentication mechanisms, the particular telecommunications channel of the plurality of telecommunications channels, wherein the plurality of telecommunications channels and authorized telecommunications channels are independently modifiable to add or remove telecommunications channels and authorized telecommunications channels by changing the policy; and regulate, for the virtual meeting, performance of the subset of the plurality of virtual meeting functions by the computing device, the participant of the virtual meeting, or both, in accordance with the policy.

10. The system of claim 8, wherein the identifier is a unique identifier generated in response to a request from a moderator to transmit a virtual meeting invitation message for the virtual meeting to the computing device.

11. The system of claim 8, wherein the instructions further cause the system to:

receive, from the computing device, a Short Message Service message that includes a one-time password generated using a one-time password token associated with the participant;

determine whether the included one-time password matches an expected one-time password generated based at least in part on a one-time password seed; and determine, based at least in part on whether the included one-time password matches the expected one-time password, whether to enable the telecommunications channel to connect the computing device to the virtual meeting.

12. The system of claim 8, wherein:

the policy specifies a maximum number of times the identifier can be utilized for joining the virtual meeting; and the instructions further cause the system to invalidate the identifier as a result of detection that the identifier has been utilized the maximum number of times.

13. The system of claim 8, wherein:

the policy specifies a maximum number of participants that can join the virtual meeting; and the instructions further cause the system to reject any requests to join the virtual meeting once the maximum number of participants have joined the virtual meeting.

14. The system of claim 8, wherein:

the identifier is further used to identify a start time for the virtual meeting; and the instructions further cause the system to determine whether the participant is authorized to join the virtual meeting using the computing device based at least in part on whether the request was received at least on the identified start time.

15. The system of claim 8, wherein the request to join the virtual meeting is generated by invocation, through the computing device, of a link included within a virtual meeting invitation message provided to the computing device upon creation of the virtual meeting.

16. A non-transitory computer-readable storage medium having stored thereon executable instructions that, when executed by one or more processors of a computer system, cause the computer system to at least:

utilize an identifier included within a request to join a virtual meeting to identify a policy of the virtual meeting, the identifier associated with the virtual meeting, the policy specifying a plurality of virtual meeting functions that can be performed for the virtual meeting;

determine, based at least in part on the policy, one or more authentication methods to be performed in order to authenticate a participant of the virtual meeting, wherein the one or more authentication mechanisms are independently modifiable to add or remove authentication mechanisms by changing the policy;

cause a participant computing device associated with the participant of the virtual meeting to prompt the participant to enter authentication claim information to authenticate an identity of the participant;

receive the authentication claim information associated with the participant;

determine whether the participant computing device is in a location associated with malicious activity;

utilize the authentication claim information associated with the participant to identify at least one participant contact method usable by a particular telecommunications channel of a plurality of telecommunications channels to contact the participant computing device associated with the participant;

determine, based at least in part on the policy and the location of the participant computing device, whether the participant is authorized to join the virtual meeting using the participant computing device;

determine, based at least in part on the policy, an identity of the participant, and a first subset of the plurality of virtual meeting functions authorized for use on the particular telecommunications channel, a second subset of the plurality of virtual meeting functions that the computing device, the participant, or both, are authorized to perform during the virtual meeting, wherein the plurality of virtual meeting functions and authorized virtual meeting functions of the plurality of virtual meeting functions are independently modifiable to add or remove virtual meeting functions and authorized virtual meeting functions by changing the policy; and transmit a request to the particular telecommunications channel to contact the computing device of the participant using the at least one participant contact method to connect the participant computing device to the virtual meeting.

17. The non-transitory computer-readable storage medium of claim 16, wherein:

the policy specifies a maximum number of participants that can join the virtual meeting; and the instructions further cause the computer system to reject a second request to join the virtual meeting if the maximum number of participants have joined the virtual meeting.

18. The non-transitory computer-readable storage medium of claim 16, wherein the instructions further cause the computer system to:
   receive a request from a computing device of a moderator to transmit a virtual meeting invitation message for the virtual meeting to the participant computing device;
   generate the identifier based at least in part on the participant computing device and the virtual meeting; and
   transmit the virtual meeting invitation message and the identifier to the participant computing device.

19. The non-transitory computer-readable storage medium of claim 16, wherein the instructions further cause the computer system to:
   determine, based at least in part on the policy, an identity of the participant of the virtual meeting, and the one or more authentication mechanisms, the particular telecommunications channel of the plurality of telecommunications channels used to connect the participant computing device to the virtual meeting, wherein the plurality of telecommunications channels and authorized telecommunications channels are independently modifiable to add or remove telecommunications channels and authorized telecommunications channels by changing the policy; and
   regulate, for the virtual meeting, performance of the subset of the plurality virtual meeting functions by the participant computing device, the participant of the virtual meeting, or both, in accordance with the policy.

20. The non-transitory computer-readable storage medium of claim 16, wherein the instructions further cause the computer system to:
   utilize the identifier to identify a start time for the virtual meeting; and
   determine whether the telecommunications channel is authorized by the policy to join the participant computing device to the virtual meeting based at least in part on whether the request was received at least on the identified start time.

21. The non-transitory computer-readable storage medium of claim 16, wherein the instructions further cause the computer system to include, within the request to the telecommunications channel, the determined at least one participant contact method to enable the telecommunications channel to connect the participant computing device to the virtual meeting.

22. The non-transitory computer-readable storage medium of claim 16, wherein:
   the policy specifies a maximum number of times the identifier can be utilized for joining the virtual meeting; and
   the instructions further cause the computer system to reject any requests to join the virtual meeting that include the identifier as a result of the identifier having been utilized the maximum number of times.

23. The non-transitory computer-readable storage medium of claim 16, wherein the instructions further cause the computer system to:
   receive, from the participant computing device, a Short Message Service message that includes a one-time password generated using a one-time password token associated with the participant;
   determine whether the included one-time password is valid; and
   determine, based at least in part on whether the included one-time password is valid, whether to open the telecommunications channel if the telecommunications channel has not been opened.

* * * * *